(12) United States Patent
Shikama et al.

(10) Patent No.: US 7,614,290 B2
(45) Date of Patent: Nov. 10, 2009

(54) ANGULAR SPEED DETECTING APPARATUS FOR CRANKSHAFT OF INTERNAL COMBUSTION ENGINE

(75) Inventors: Mahito Shikama, Wako (JP); Toshinori Tsukamoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 81 days.

(21) Appl. No.: 11/897,000

(22) Filed: Sep. 7, 2007

(65) Prior Publication Data

US 2008/0098806 A1     May 1, 2008

(30) Foreign Application Priority Data

Oct. 30, 2006   (JP) .............. 2006-294122

(51) Int. Cl.
*G01P 3/44* (2006.01)
(52) U.S. Cl. .................................. 73/114.25
(58) Field of Classification Search ............. 73/114.02, 73/114.04, 114.25–114.27
See application file for complete search history.

(56) References Cited

U.S. PATENT DOCUMENTS

| | | | |
|---|---|---|---|
| 5,428,991 A | | 7/1995 | Klenk |
| 5,481,909 A | * | 1/1996 | Deutsch et al. .......... 73/114.15 |
| 5,528,931 A | | 6/1996 | James |
| 5,531,108 A | * | 7/1996 | Feldkamp et al. ........ 73/114.05 |
| 5,696,316 A | * | 12/1997 | Mezger et al. ........... 73/114.26 |
| 5,704,336 A | * | 1/1998 | Wrobel ..................... 123/494 |
| 5,747,679 A | * | 5/1998 | Dietz et al. .............. 73/114.03 |
| 5,789,658 A | * | 8/1998 | Henn et al. ............... 73/1.37 |
| 5,864,775 A | * | 1/1999 | Bradshaw et al. ........... 702/104 |
| 6,062,071 A | * | 5/2000 | Henn et al. .............. 73/114.04 |
| 6,142,011 A | * | 11/2000 | Angermaier .............. 73/114.25 |
| 6,250,144 B1 | | 6/2001 | Birk |
| 7,006,913 B2 | * | 2/2006 | Sgatti et al. ................. 701/111 |
| 7,284,538 B2 | * | 10/2007 | Ishizuka et al. ............. 123/481 |
| 7,480,591 B2 | * | 1/2009 | Shikama et al. ............ 702/182 |
| 2007/0157713 A1 | * | 7/2007 | Tsukamoto et al. ........ 73/117.3 |
| 2008/0103681 A1 | * | 5/2008 | Shikama et al. ............. 701/111 |

FOREIGN PATENT DOCUMENTS

| | | |
|---|---|---|
| JP | 10-009040 | 1/1998 |
| JP | 3571043 B2 | 7/2004 |
| WO | WO 93/07497 | 4/1993 |

* cited by examiner

*Primary Examiner*—Lisa M Caputo
*Assistant Examiner*—Freddie Kirkland, III
(74) *Attorney, Agent, or Firm*—Arent Fox LLP

(57) ABSTRACT

An angular speed detecting apparatus for a crankshaft of an internal combustion engine. The angular speed detecting apparatus detects a rotational angular speed of the crankshaft based on an output of a pulse generator which generates a crank pulse at every predetermined rotational angle of the crankshaft. An average value of a speed parameter indicating a rotational angular speed of the crankshaft is calculated using the data sampled at intervals of 720/N degrees where N is a number of cylinders of the engine. A learning correction coefficient for correcting the speed parameter is calculated according to the average value. The speed parameter is corrected using the learning correction coefficient.

15 Claims, 14 Drawing Sheets

ANGULAR SPEED DETECTING APPARATUS FOR CRANKSHAFT OF INTERNAL COMBUSTION ENGINE

BACKGROUND OF THE INVENTION

1. Field of the Invention

The present invention relates to an angular speed detecting apparatus for a crankshaft of an internal combustion engine, which detects a rotational angular speed of the crankshaft of the engine, and particularly, to an angular speed detecting apparatus having a pulse generator for generating a crank pulse at every predetermined rotational angle and correcting a time interval of when the crank pulse is generated.

2. Description of the Related Art

Japanese Patent Publication No. 3571043 (JP-'043) discloses a method for correcting a time interval of when the crank pulse is generated in a pulse generator which generates the crank pulse at every predetermined rotational angle of the crankshaft of the internal combustion engine. According to the disclosed method, a ratio of an amount of change in the time interval of when the crank pulse is generated during engine braking is calculated, and a correction value of the time interval of pulse generation is calculated by averaging data of the calculated ratio.

Even in a condition where fuel is not supplied to the engine during engine braking, a rotational speed changing component attributed to the inertial forces of the movable parts of the engine is contained in the detected time interval of pulse generation. Therefore, if the correction value calculated by the method shown in JP-'043 is applied, the time interval of pulse generation is obtained, but without accounting for the influence of the rotational speed changing components.

On the other hand, when a misfire determination is performed based on the time interval of pulse generation, it is necessary to remove the influence of the rotational speed changing component attributed to the above-described inertial forces from the detected time interval of pulse generation in order to accurately perform the misfire determination. If the above-described conventional correction method is applied, the rotational speed changing component is removed with a component due to a mechanical deviation of the pulse generator. Accordingly, accurate misfire determination cannot be performed using the conventional correction method.

SUMMARY OF THE INVENTION

The present invention was derived in contemplation of the above-described concerns. An aspect of the invention is to provide an angular speed detecting apparatus for a crankshaft of an internal combustion engine, which corrects a deviation of the time interval of pulse generation due to a characteristic of the pulse generator itself, without being influenced by the rotational speed changing component attributed to the inertial forces, thereby enabling an accurate misfire determination to be performed.

To attain at least the above-described aspect, the present invention provides an angular speed detecting apparatus for a crankshaft of an internal combustion engine which detects a rotational angular speed of the crankshaft based on an output of a pulse generator for generating a crank pulse at every predetermined rotational angle of the crankshaft. The angular speed detecting apparatus includes an averaging means, a learning means, and a correcting means. The averaging means calculates an average value of a speed parameter (CRME) data that is indicative of a rotational angular speed of the crankshaft. The data are sampled at intervals of "720/N" degrees where "N" is a number of cylinders of the engine. The learning means calculates a learning correction coefficient (KCRREF) for correcting the speed parameter according to the average value. The correcting means corrects the speed parameter (CRME) with the learning correction coefficient (KCRREF).

With the above-described structural configuration, the average value of the speed parameter data sampled at intervals of "720/N" degrees is calculated, the learning correction coefficient for correcting the speed parameter is calculated according to the average value, and the speed parameter is corrected by the learning correction coefficient. Since the rotational speed changing component attributed to the inertial forces changes in the period of "720/N" degrees, the influence of the rotational speed changing component attributed to the inertial forces is eliminated by calculating the average value of the speed parameter data sampled at intervals of "720/N" degrees. Therefore, by calculating the learning correction coefficient according to the average value thus calculated, and correcting the speed parameter using the learning correction coefficient, any deviation of the time interval of the pulse generation due to the characteristic of the pulse generator itself is accurately corrected.

Preferably, the learning means calculates and stores the learning correction coefficient (KCRREF) corresponding to one rotation of the crankshaft.

Accordingly, it is possible to perform the correction by using the learning correction coefficients corresponding to all of the pulses output from the pulse generator corresponding to one rotation of the crankshaft.

Alternatively, the learning means calculates and stores the learning correction coefficient (KCRREF) corresponding to two rotations of the crankshaft.

Accordingly, speed changing components having a period of two rotations of the crankshaft can be corrected. For example, such corrections can be made when there are changes in the time interval of the pulse generation due to axle center movement of the crankshaft.

Preferably, the averaging means calculates an average value of the speed parameter data sampled within a sampling range (SMP) according to a number of cylinders of the engine, and the learning means calculates the learning correction coefficient (KCRREF) corresponding to a predetermined central angular range (LRN) located at the center of the sampling range (SMP). The sampling range (SMP) is set to an angular width obtained by multiplying "720/N" degrees by an odd number, and the predetermined central angular range (LRN) has a width of "720/N" degrees.

With the above-described structural configuration, it is possible to calculate the average value of the speed parameter data sampled within the sampling range, which is set to the angular width obtained by multiplying "720/N" degrees by an odd number, according to the number of cylinders of the engine. The learning correction coefficient, corresponding to the predetermined central angular range of "720/N" degrees located at the center of the sampling range, is calculated. For example, the sampling range is set to an angular width of 3 times 120 degrees for a 6-cylinder engine, an angular width of 3 times 180 degrees for a 4-cylinder engine, and an angular width of 5 times 90 degrees for an 8-cylinder engine. By setting the sampling range as described above and calculating the learning correction coefficient corresponding to the predetermined central angular range, the speed changing component (hereinafter referred to as "deceleration changing component") due to deceleration of the engine rotational speed is offset by averaging the speed parameter data while the engine is decelerating. Accordingly, the learning correction coefficient is accurately calculated.

Preferably, the averaging means performs an averaging calculation so that sampled data obtained in the predetermined central angular range (LRN) is weighted greater than sampled data obtained in an angular range other than the predetermined central angular range when the sampling range (SMP) exceeds 360 degrees.

With the above-described structural configuration, when the sampling range exceeds 360 degrees, the averaging calculation is performed so that the sampled data obtained in the predetermined central angle is weighted greater than the sampled data obtained in an angular range other than the predetermined central angular range. Therefore, the averaging of the sampled data obtained in the predetermined central angular range for which the learning correction coefficients are calculated is appropriately performed, thereby obtaining accurate learning correction coefficients.

Preferably, the angular speed detecting apparatus further includes error ratio calculating means and average error ratio calculating means. The error ratio calculating means calculates an error ratio (KCRERR) by dividing the average value by the sampled speed parameter. The average error ratio calculating means calculates an average error ratio (KCRERRAVE) which is an average value of all of the error ratios obtained in the predetermined central angular range (LRN). The learning means calculates a corrected error ratio (KCRERRM) by subtracting the average error ratio (KCRERRAVE) from the error ratio (KCRERR) and adding "1" to the subtracted error ratio, and then calculates the learning correction coefficient (KCRREF) according to the corrected error ratio (KCRERRM).

With the above-described structural configuration, the error ratio is calculated by dividing the speed parameter average value by the sampled speed parameter. The average error ratio is an average value of all of the error ratios obtained in the predetermined central angular range. The corrected error ratio is calculated by subtracting the average error ratio from the error ratio and adding "1" to the subtracted error ratio. The learning correction coefficient is then calculated according to the corrected error ratio. For example, if a method is adopted in which the averaging calculation of the speed parameter is performed using a larger number of sampled data, a transient changing component may not be offset by the averaging calculation. By calculating the learning correction coefficient according to the above-described corrected error ratio, any influence of the deceleration changing component is eliminated, and accurate learning correction coefficients are obtained.

The predetermined angle corresponding to the period of generation of the crank pulse has a value of "720/N/M" degrees, and it is preferable to set the predetermined angle to a value which is sufficiently smaller than "720/N" degrees by setting the value "M" to an integer equal to or greater than "8".

DETAILED DESCRIPTION OF THE PREFERRED EMBODIMENTS

Preferred embodiments of the present invention will now be described with reference to the drawings.

First Embodiment

Figure 1:
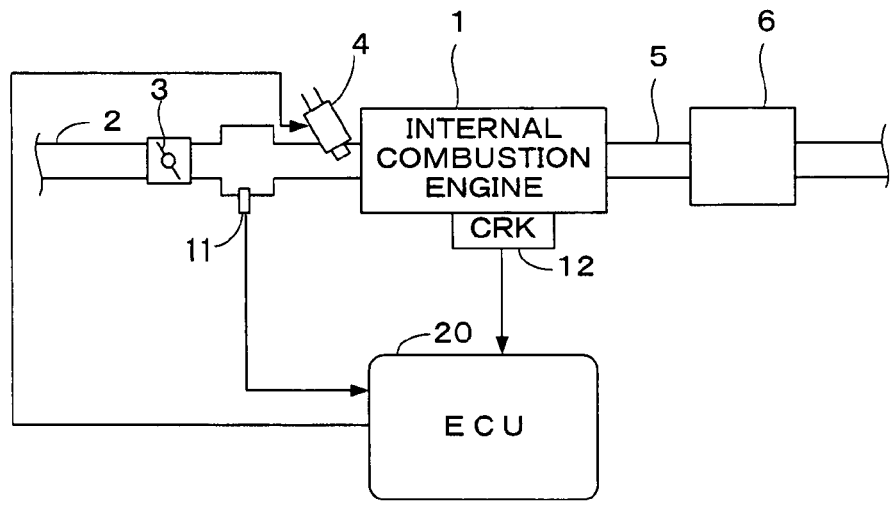
FIG. 1 is a schematic diagram of an internal combustion engine and a control system therefor according to one embodiment of the present invention.

FIG. 1 is a schematic diagram showing a configuration of an internal combustion engine and a control system therefor according to one embodiment of the present invention. The internal combustion engine 1 (hereinafter referred to as "engine") has 6 cylinders and is provided with an intake pipe 2 and an exhaust pipe 5. The intake pipe 2 is provided with a throttle valve 3. The exhaust pipe 5 is provided with a catalytic converter 6 for purifying exhaust gases.

A fuel injection valve 4 is provided for each cylinder at a position slightly upstream of an intake valve (not shown) in the intake pipe 2 and between the engine 1 and the throttle valves 3. Each injection valve is connected to a fuel pump (not shown) and electrically connected to an electronic control unit 20 (hereinafter referred to as "ECU 20"). A valve opening period of the fuel injection valve 4 is controlled by a control signal from the ECU 20.

An absolute intake pressure (PBA) sensor 11 is provided immediately downstream of the throttle valve 3. The absolute intake pressure sensor 11 detects a pressure in the intake pipe 2 and a detection signal is supplied to the ECU 20.

A crank angle position sensor 12 for detecting a rotational angle of the crankshaft (not shown) of the engine 1 is connected to the ECU 20. A signal according to the detected rotational angle of the crankshaft is supplied to the ECU 20. The crank angle position sensor 12 includes a cylinder discrimination sensor which outputs a pulse (hereinafter referred to as "CYL pulse") at a predetermined angle position of a specific cylinder of the engine 1. The crank angle position sensor includes a TDC sensor, which outputs a TDC pulse at a crank angle position of a predetermined crank angle before a top dead center (TDC) starting an intake stroke in each cylinder (i.e., at every 120 degrees crank angle in the case of a 6-cylinder engine), and a CRK sensor for generating one pulse (hereinafter referred to as "CRK pulse") with a crank angle period (e.g., period of 6 degrees, shorter than the period of generation of the TDC pulse). The CYL pulse, the TDC pulse and the CRK pulse are supplied to the ECU 20. The CYL, TDC and CRK pulses are used to control the various timings, such as a fuel injection timing and an ignition timing, and to detect an engine rotational speed NE.

Further, the ECU 20 detects a misfire occurring in the engine 1 based on a time interval of generation of the CRK pulse (hereinafter referred to as "time period parameter") CRME. The CRK sensor has a pulse wheel and a pickup coil. The pulse wheel is fixed on the crankshaft and has teeth formed on the outer periphery at fixed angular intervals. The pickup coil is mounted facing the pulse wheel. An alternate current signal is generated in the pickup coil with rotation of the pulse wheel, and the alternate current signal is converted to the CRK pulse so that the CRK sensor outputs the CRK pulse. Therefore, a deviation (hereinafter referred to as "pulse wheel deviation") of the time interval of generation of the CRK pulse is generated depending on the manufacturing accuracy of the pulse wheel. Therefore, when detecting a misfire based on the time period parameter CRME, a learning correction coefficient KCRREF is calculated and the time period parameter CRME is corrected using the learning correction coefficient KCRREF to calculate a corrected period parameter in order to eliminate the influence of the pulse wheel deviation. The corrected period parameter is then applied to the misfire detection.

The ECU 20 includes an input circuit, a central processing unit (hereinafter referred to as "CPU"), a memory circuit and an output circuit. The input circuit performs numerous functions, including: shaping the waveforms of input signals from the various sensors; correcting the voltage levels of the input signals to a predetermined level; and converting analog signal values into digital signal values. The memory circuit preliminarily stores various operating programs to be executed by the CPU and stores the results, or the like, computed by the CPU. The output circuit supplies control signals to the fuel injection valve 4, and the like. The CPU in the ECU 20 performs the misfire detection described below.

The method of the misfire detection according to the embodiment is described below in detail.

Figure 2A:
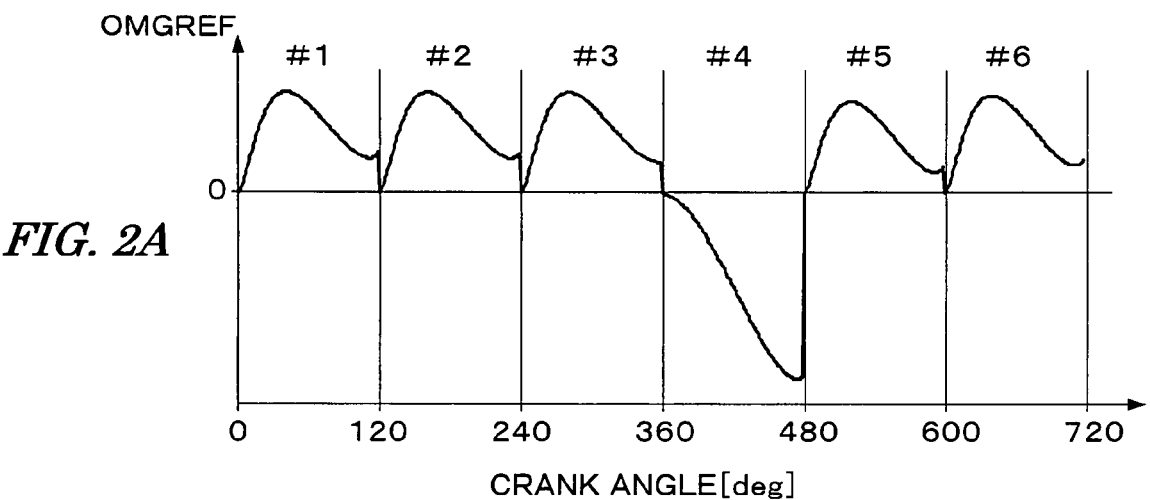
FIGS. 2A and 2B are diagrams illustrating a method of the misfire determination.
Figure 2B:
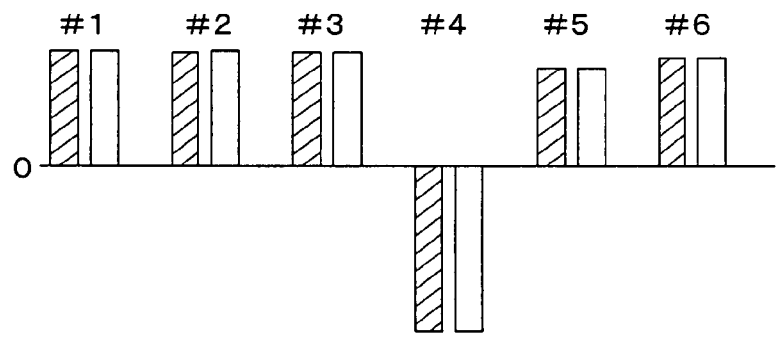

FIG. 2A is a time chart showing changes in a relative rotational speed OMGREF with reference to a rotational speed (hereinafter referred to as "reference rotational speed") detected at the time a piston of each cylinder is positioned in the vicinity of a compression top dead center. The compression top dead center is defined as a top dead center from which the combustion stroke of each cylinder starts. In the following explanation, the description of "at the compression dead center of each cylinder" or "in the vicinity of the compression top dead center of each cylinder" means "at the time the piston of each cylinder is positioned at the compression top dead center" or "at the time the piston of each cylinder is positioned in the vicinity of the compression top dead center". The relative rotational speed OMGREF is calculated by subtracting the reference rotational speed from a rotational speed detected at every six degrees of the crank angle (calculated from the time period parameter CRME). #1 to #6 in FIG. 2A are cylinder discrimination numbers (which are different from cylinder numbers described below) for discriminating the six cylinders which are numbered in the order of ignition. In the combustion stroke after the compression top dead center, if the ignition is performed normally, the relative rotational speed OMGREF takes a positive value. But, if a misfire occurs, the relative rotational speed OMGREF takes a negative value. That is, in the example shown in FIG. 2A, the normal combustion is performed in cylinders #1 to #3, #5, and #6, and a misfire has occurred in cylinder #4. Therefore, an integrated value obtained by integrating the relative rotational speed OMGREF calculated at every six degrees of the crank angle during the one TDC period (period of 120 degrees of the crank angle corresponding to the combustion stroke) takes a negative value for cylinder #4 where a misfire has occurred and takes a positive value for the cylinder where the normal combustion is performed as indicated by the bar graphs (bar graphs on the right side with no hatching) of FIG. 2B. Accordingly, the cylinder where a misfire has occurred is determined. The integrated value obtained by the above-described calculation is a parameter indicative of a torque generated by each cylinder.

The bar graphs with hatching (FIG. 2B) show an integrated value obtained by integrating a relative time period parameter CRMEREF with reference to a time period parameter (hereinafter referred to as "reference time period parameter") detected in the vicinity of the compression top dead center for one TDC period. The relative time period parameter CRMEREF is calculated by subtracting a time period parameter detected every six degrees of the crank angle from the reference time period parameter. That is, the relative time period parameter CRMEREF takes a positive value if the torque is generated by the combustion but takes a negative value if the torque is not generated due to a misfire. Therefore, an integrated value of the relative time period parameter CRMEREF takes a negative value for cylinder #4 where a misfire has occurred and takes a positive value for the cylinders where the normal combustion is performed, similarly to the integrated value of the relative rotational speed OMGREF. Therefore, it is possible to similarly perform the misfire determination using the time period parameter CRME without converting the time period parameter CRME to the rotational speed OMG.

Figure 3A:
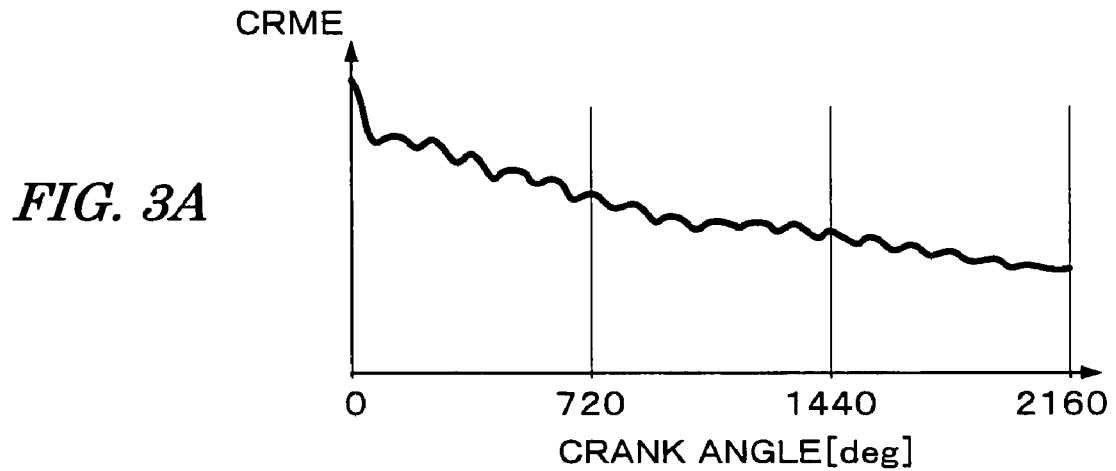
FIGS. 3A-3C are time charts showing changes in the parameters calculated for the misfire determination.
Figure 3B:
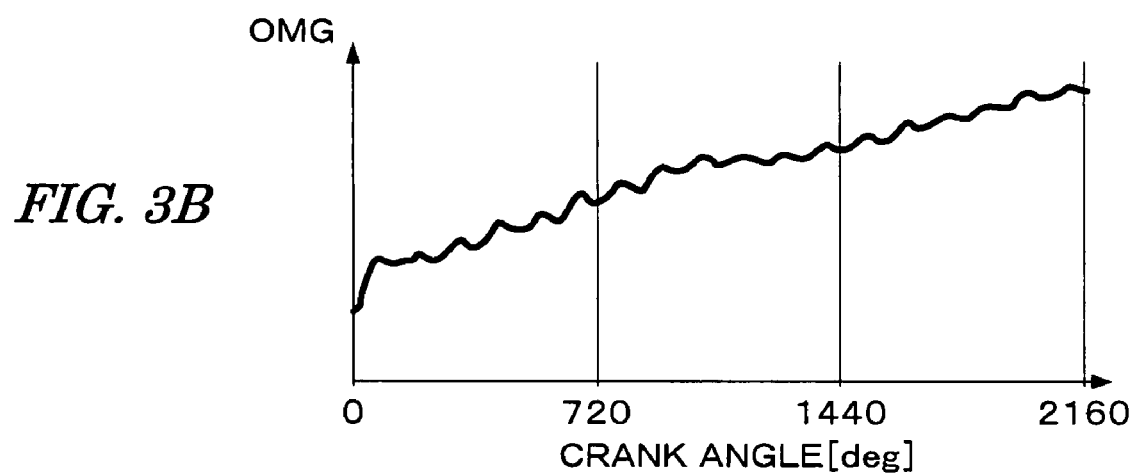
Figure 3C:
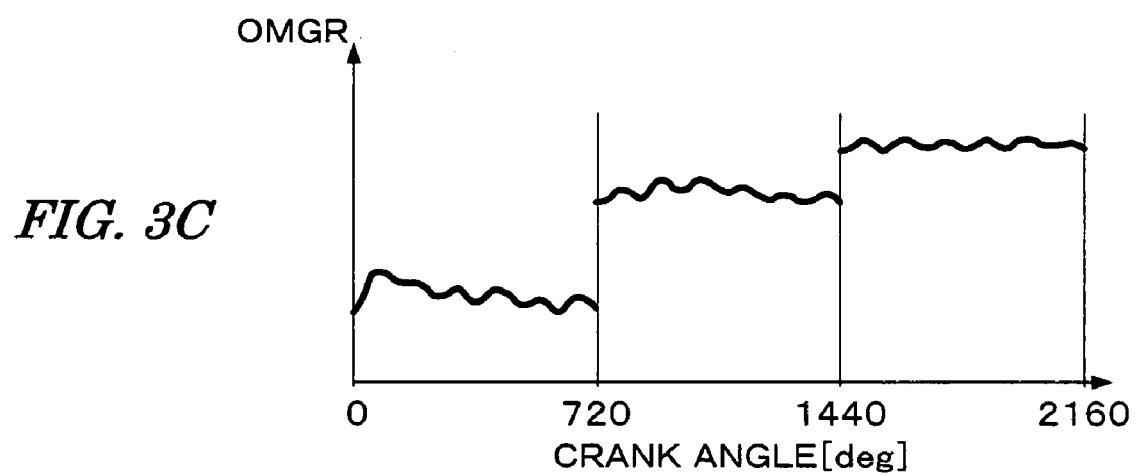

FIGS. 3A-3C and 4A-4C are time charts for more specifically explaining the above-described misfire determination method. In FIGS. 3A-3C and 4A-4C, an example where the engine rotational speed NE gradually rises is illustrated. FIG. 3A shows changes in the time period parameter CRME, and FIG. 3B shows changes in the rotational speed OMG calculated from the time period parameter CRME. FIG. 3C shows changes in a filtered rotational speed OMGR calculated by performing a 720-degree filtering on the rotational speed OMG. The 720-degree filtering is a filtering for extracting a changing component within a comparatively short period by canceling a linearly changing component in one combustion cycle period. The details of this filtering will be described later. The 720-degree filtering is performed to eliminate a rotational speed changing component due to a torque applied to the engine 1 from a load on the engine 1 (a torque applied from wheels of the vehicle and auxiliaries driven by the engine 1, a torque due to the friction of the sliding parts of the engine 1, or the like).

Figure 4A:
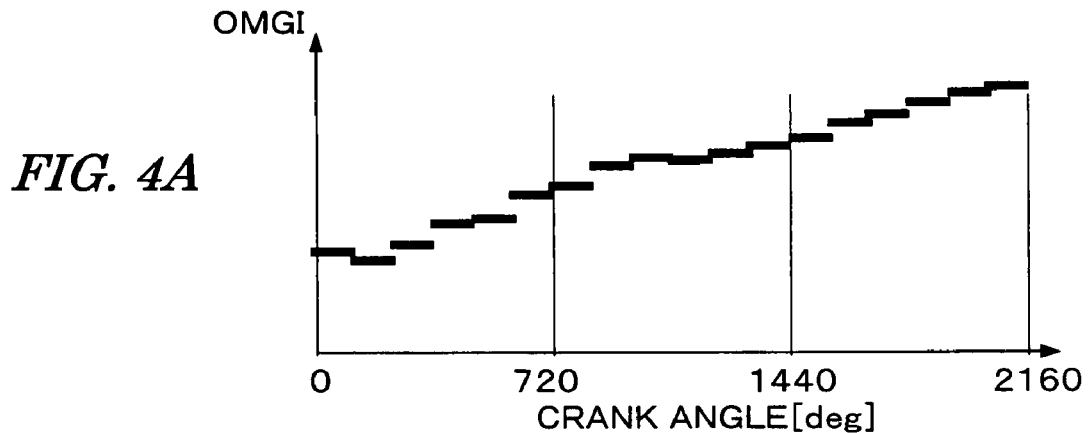
FIGS. 4A-4C are time charts showing changes in the parameters calculated for the misfire determination.

FIG. 4A shows changes in an inertial force rotational speed OMGI calculated at the same timing of the calculation of the reference rotational speed in the vicinity of the compression top dead center of each cylinder. The inertial force rotational speed OMGI is calculated according to a total mass of reciprocating parts (pistons and connecting rods) of the engine 1, a length of the connecting rod, a crank radius, and an inertia moment due to rotating parts driven by the engine 1, such as a crank pulley, a torque converter, and a lockup clutch.

Figure 4B:
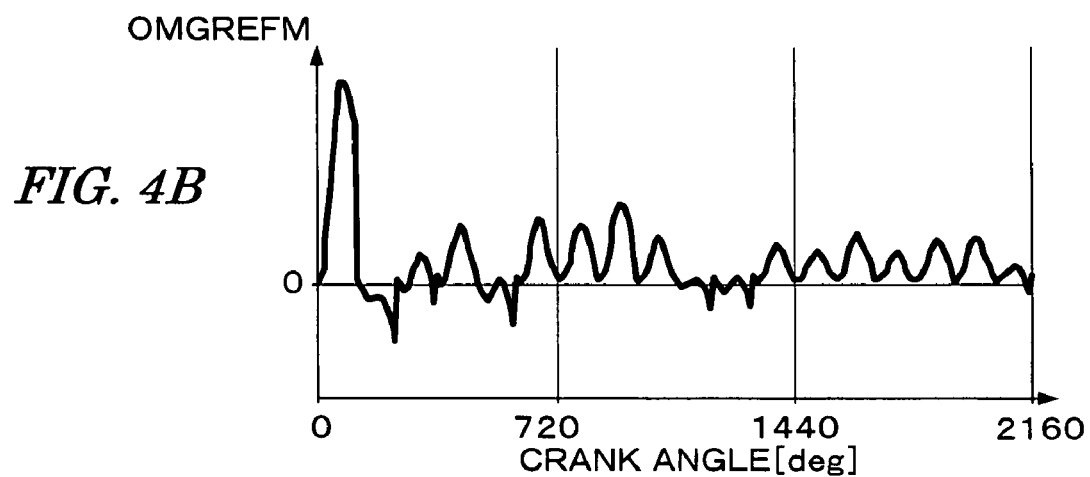
Figure 4C:
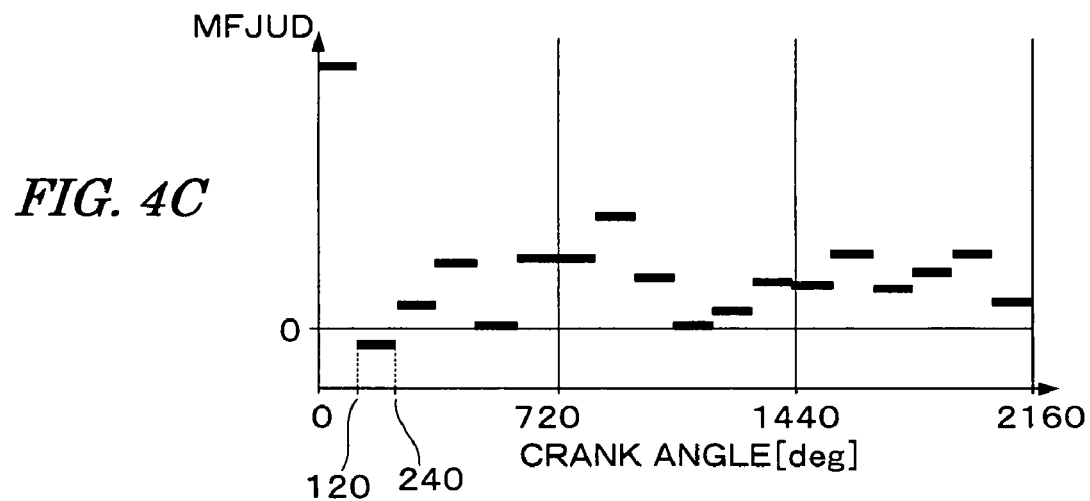

FIG. 4B shows changes in a modified relative rotational speed OMGREFM (=OMGREF+OMGI) calculated by adding the inertial force rotational speed OMGI to the relative rotational speed OMGREF. FIG. 4C shows changes in a determination parameter MFJUD, which is an integrated value calculated by integrating the modified relative rotational speed OMGREFM for one TDC period. In this example, the determination parameter MFJUD takes a negative value corresponding to a range of 120 to 240 degrees of the crank angle, and it is determined that a misfire has occurred in cylinder #2.

Figure 5:
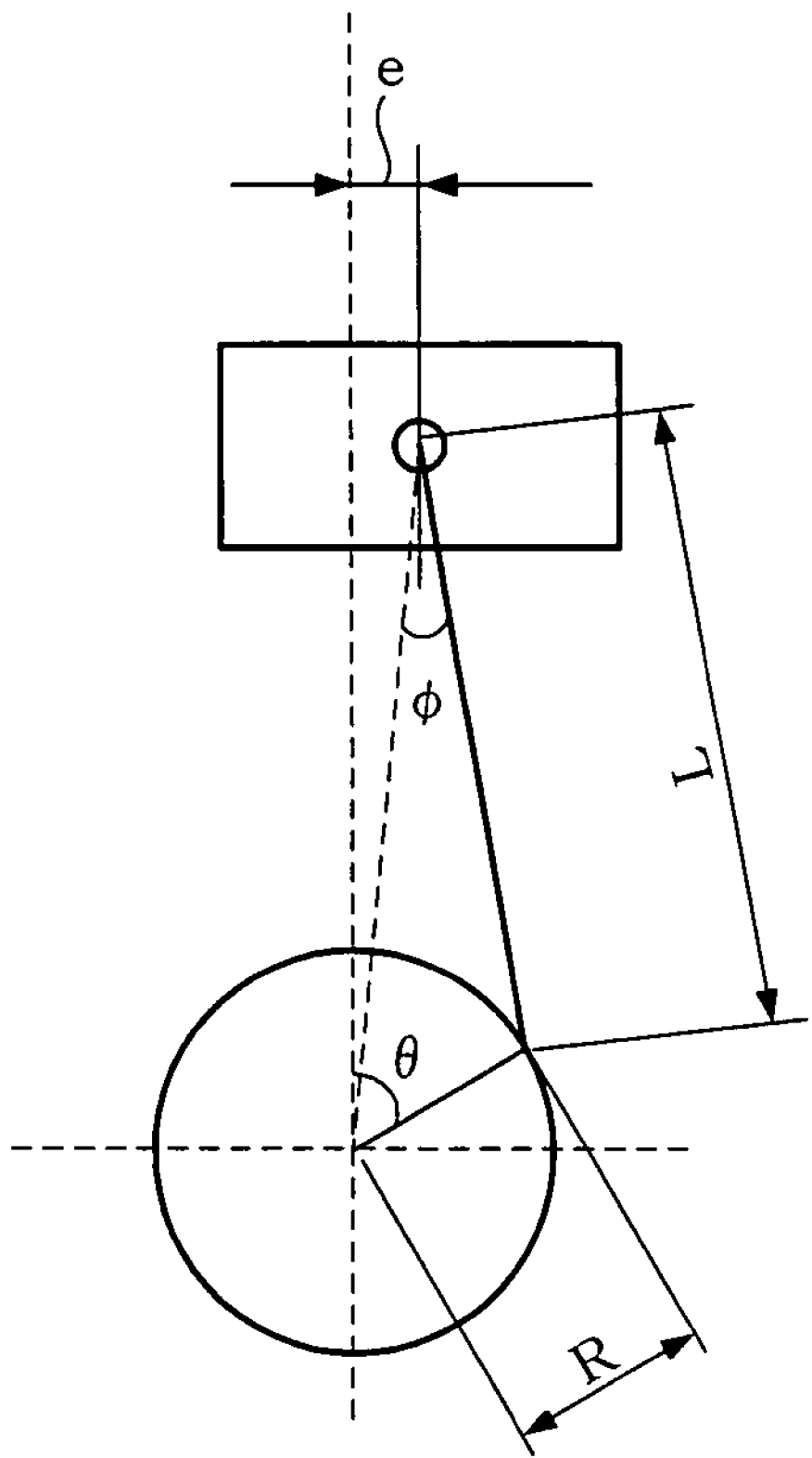
FIG. 5 is a diagram illustrating a calculation method of an inertial force torque due to operation of reciprocating moving parts of the engine.

Next, a method for calculating the inertial force rotational speed OMGI is described below. A torque by inertial forces generated in one cylinder (hereinafter referred to as "single cylinder inertia torque TI1") is calculated by equation (1), where a length of the connecting rod is "L", a crank radius is "R", an offset is "e", a rotational angular speed of the crankshaft is "ω", a total mass of a piston and a connecting rod is "m", and angles "Θ" and "φ" are respectively defined as illustrated in FIG. 5. In the equations described below, the angle unit is "radian [rad]".

$$TI1 = -mR^2\omega^2(\cos\theta + e\sin\theta/L + R\cos2\theta/L)\cdot\cos\left\{\frac{\pi}{2} - (\phi + \theta)\right\}/\cos\phi \quad (1)$$

Figure 6A:
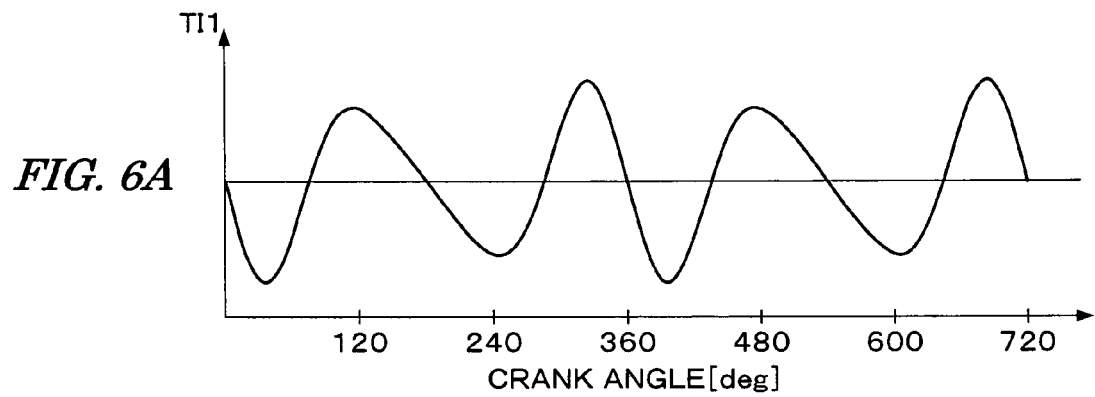
FIGS. 6A-6C show waveforms illustrating a relationship between an inertial force torque per one cylinder (TI1), a combined inertial torque (TI) of six cylinders, and an inertial force rotational speed ($\omega$I)
Figure 6B:
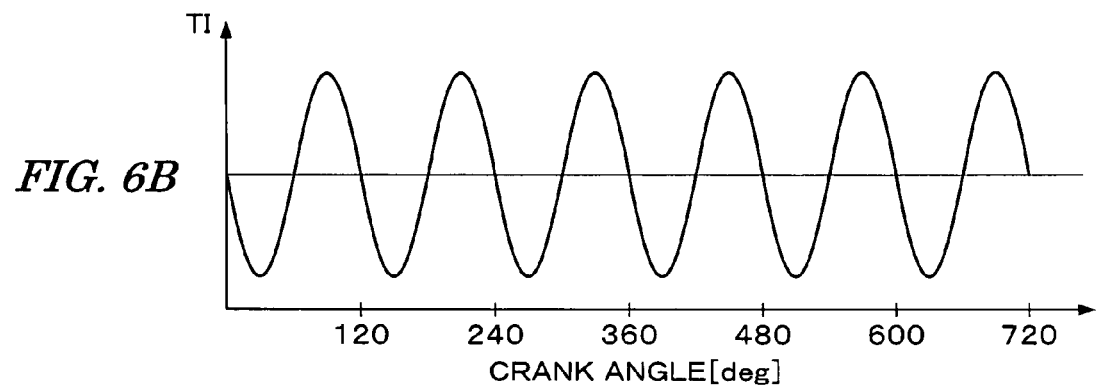

FIG. 6A shows a graph of the single cylinder inertia torque TI1 calculated using equation (1) as a function of the crank angle θ. A combined inertia torque TI is obtained by adding six single cylinder inertia torques TI1 with the 120-degree phase shift changes as shown in FIG. 6B. The combined inertia torque TI is approximated using equation (2).

$$TI = -A\sin 3\theta \quad (2)$$

where "A" is a coefficient proportional to the square of the rotational angular speed ω [rad/s].

Figure 6C:
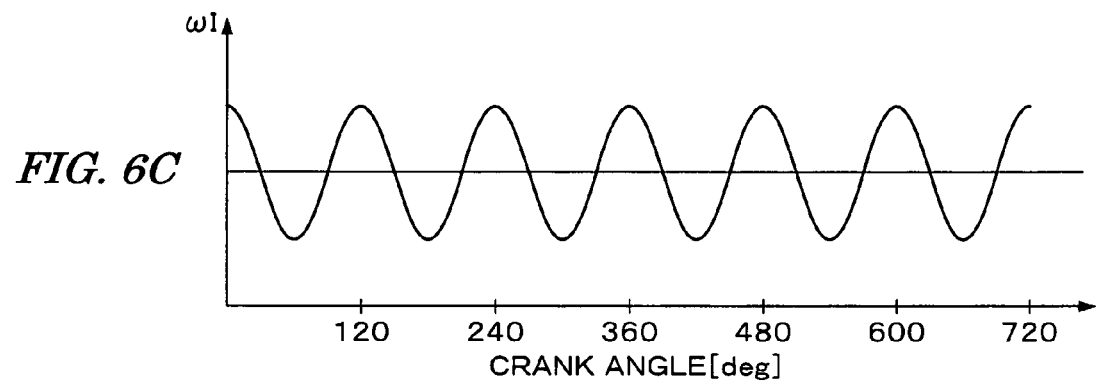

On the other hand, if the inertia moment of rotating parts, such as a crank pulley and a torque converter, is expressed by "I", the combined inertia torque TI is calculated using equation (3) (refer to FIG. 6C).

$$TI = I\times(d\omega/dt) \quad (3)$$

Equation (4) is obtained from equations (2) and (3). If equation (4) is solved for the rotational angular speed ω, the inertial force rotational speed ωI corresponding to the combined inertial torque TI is calculated using equation (5).

$$-A\sin 3\theta = I\times(d\omega/dt) \quad (4)$$

$$\omega I = (A\cos 3\theta\times dt/d\omega)/3I \quad (5)$$

Therefore, the inertial force rotational speed OMGI at the compression top dead center is calculated using equation (6) which is obtained by applying "0" to θ of equation (5).

$$OMGI=(A/3I)(1/OMG) \quad (6)$$

Since the coefficient A is proportional to the square of the rotational speed OMG, equation (6) is transformed to equation (7) where "K" is a proportionality constant.

$$OMGI=K\times OMG/3I \quad (7)$$

FIG. 6B shows changes in the combined inertia torque TI, and FIG. 6C shows changes in the inertial force rotational speed ωI corresponding to the combined inertia torque TI. As shown in FIG. 6C, the inertial force rotational speed OMGI takes a maximum value at the compression top dead center (θ=0, 120, 240, . . . ). Accordingly, a modified relative rotational speed OMGREFM is obtained by adding the inertial force rotational speed OMGI to the relative rotational speed OMGREF (it is equivalent to subtracting the inertial force rotational speed OMGI from the reference rotational speed) to eliminate the influence of the inertial force rotational speed ωI. The periodical changing component of the inertial force rotational speed ωI shown in FIG. 6C is canceled by integrating the modified relative rotational speed OMGREFM for one TDC period (120 degrees).

Next, a method for eliminating any influence of the disturbance due to torsion of the crankshaft, detection error of the time period parameter CRME, and the like, is described.

Figure 7A:
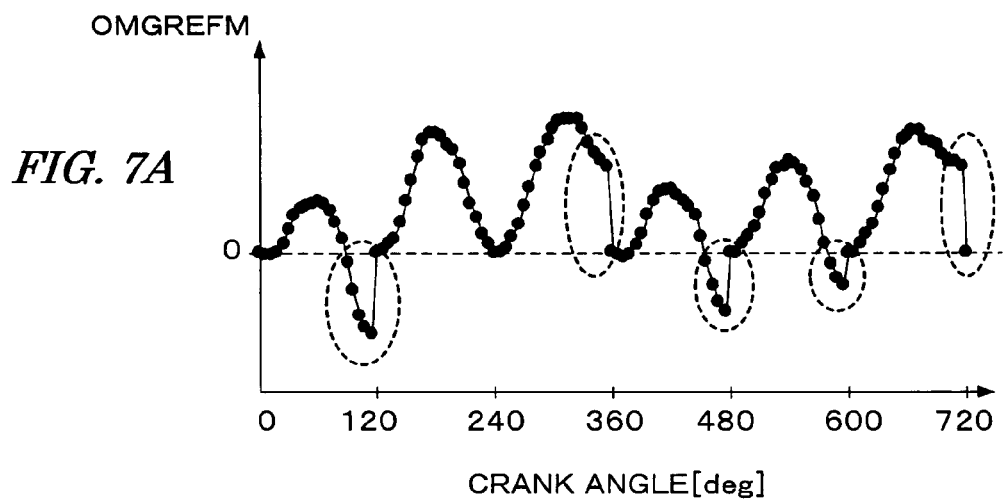
FIGS. 7A and 7B are time charts illustrating influence of disturbances contained in an output of a crank angle position sensor.
Figure 7B:
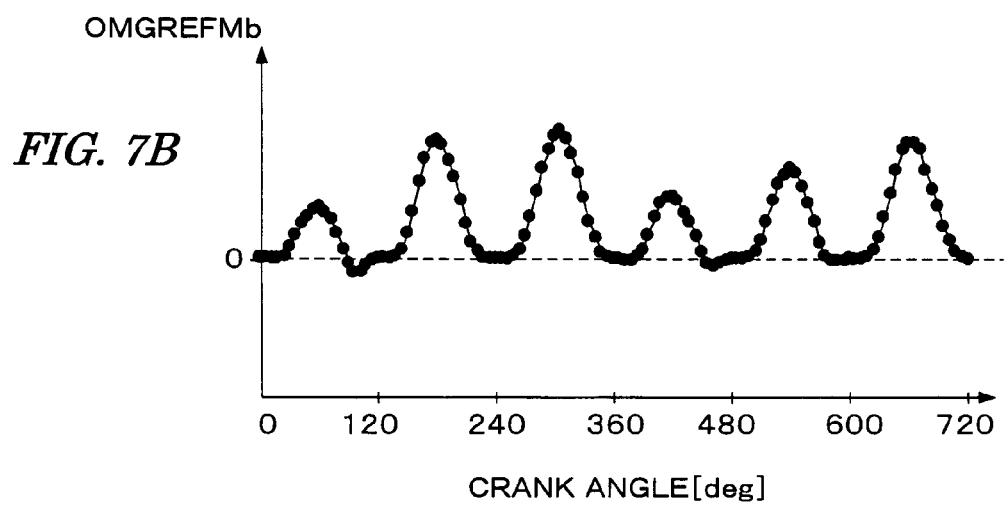

FIG. 7A shows an example of actually measured data of the modified relative rotational speed OMGREFM. The portions surrounded with the dashed lines in FIG. 7A show data influenced by the above-described disturbance. If any influence of such disturbance exists, the possibility of an incorrect misfire determination becomes relatively high. Therefore, in this embodiment, the modified relative rotational speed OMDREFM is multiplied by a combustion correlation function FCR to eliminate any influence of the above-described disturbance. The combustion correlation function FCR approximates changes in the rotational speed when normal combustion is performed, and there is no disturbance affecting the detected value of the crank angle position sensor. FIG. 7B shows the modified relative rotational speed OMGREFMb calculated by multiplying the modified relative rotational speed OMGREFM shown in FIG. 7A by the combustion correlation function FCR. The waveforms corresponding to the portions surrounded with the dashed lines shown in FIG. 7A are improved.

Figure 8:
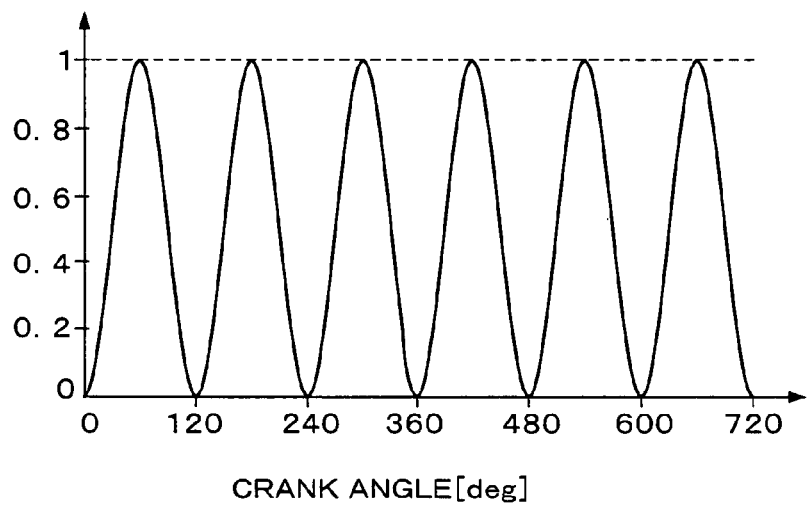
FIG. 8 shows an example of a combustion correlation function (FCR)

As the combustion correlation function FCR, a function shown in FIG. 8, i.e., the function defined by equation (8), is used. In equation (8), "N" is a number of cylinders and "θ" is a crank angle defined with reference to a crank angle at which a piston in a specific cylinder of the engine is positioned at the top dead center (refer to FIG. 5). FIG. 8 shows the combustion correlation function FCR corresponding to a 6-cylinder engine used in this embodiment.

$$FCR=\{1-2\cos(N\cdot\theta/2)\}/2 \quad (8)$$

Figure 9A:
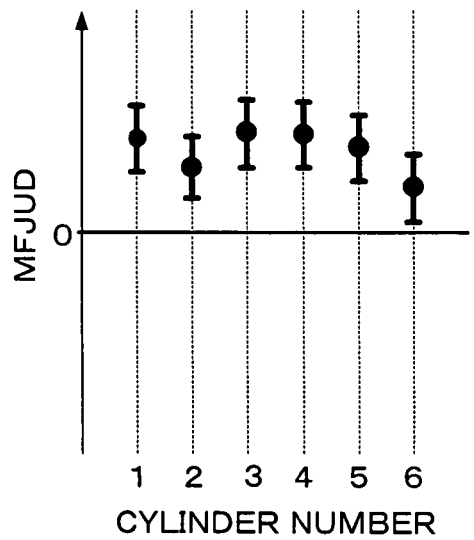
FIGS. 9A and 9B are diagrams showing variations in measured data of a misfire determination parameter.
Figure 9B:
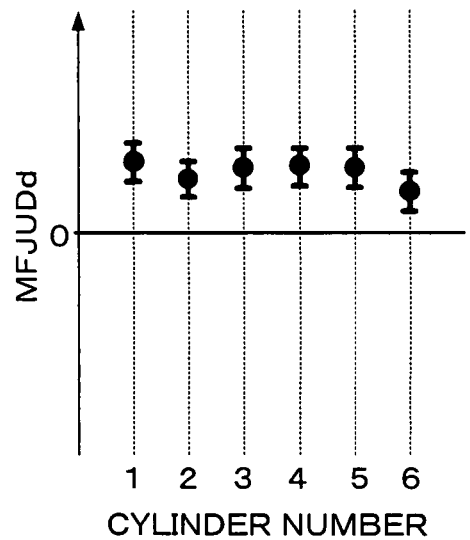

FIG. 9A shows an example of varying ranges in the determination parameter MFJUD (average value (indicated by a round mark)±3σ) obtained when the relative rotational speed is not corrected by the combustion correlation function. FIG. 9B shows an example of varying ranges in the determination parameter MFJUDd obtained when the relative rotational speed is corrected by the combustion correlation function. By performing the correction using the combustion correlation function FCR, the calculation accuracy of the determination parameter MFJUDd is improved, as clearly seen from these figures, so that the width of the variation range is reduced (reduced by about 40% in the illustrated example). Consequently, accuracy of the misfire determination is improved.

Next, a method of calculating the learning correction coefficient KCRREF for correcting the pulse wheel deviation of the CRK sensor is described. As described above, when the engine is rotating, the time period parameter CRME changes depending on the inertial force rotational speed ωI even if a fuel cut operation is performed, wherein fuel is not supplied to the engine. Consequently, if the learning correction coefficient is calculated by simply performing the averaging calculation, the learning correction coefficient takes a value which makes a total speed changing component equal to "0". The total speed changing component is a sum of the inertial force rotational speed component and the speed changing component due to the pulse wheel deviation. In this embodiment, an error ratio KCRERR of an average value CRMEAV of the time period parameter CRME sampled at intervals of 120 degrees is first calculated. The learning correction coefficient KCRREF is calculated according to the error ratio KCRERR since the inertial force rotational speed ωI changes in the period of 120 degrees, i.e., the generation period (720 degrees/N) of the TDC pulse, as shown in FIG. 6C.

Figure 10:
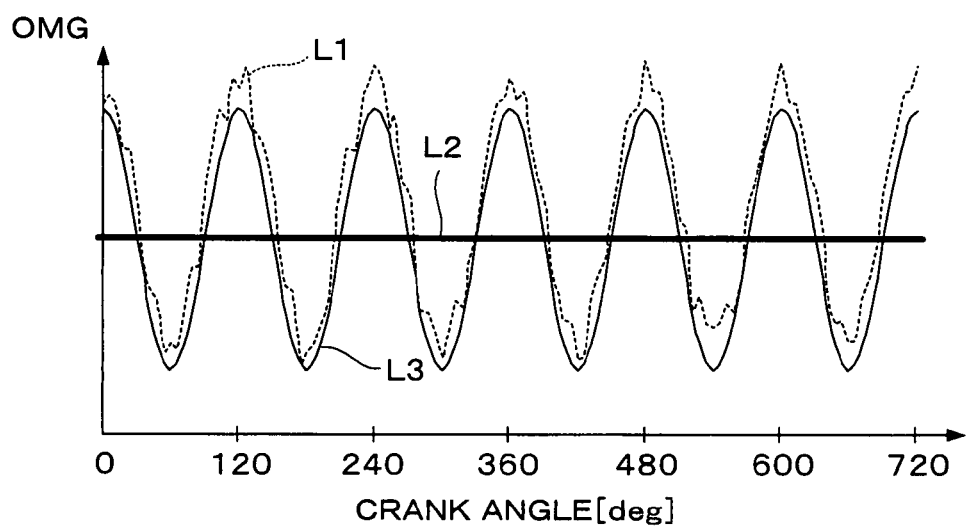
FIG. 10 is a time chart showing data after a correction of a pulse wheel deviation compared with the conventional method.

FIG. 10 is a time chart showing changes in the rotational speed OMG calculated from the time period parameter CRME during the fuel cut operation. The dashed line L1 shows actually measured data, the solid line L2 shows data corrected by the conventional method, and the solid line L3 shows data corrected by the method of this embodiment. According to the conventional method, the inertial force rotational speed component is removed from the measured data and the corrected rotational speed OMG does not change. According to the method of this embodiment, the speed changing component due to the pulse wheel deviation is removed, but the inertial force speed component is detected as it is.

Figure 11:
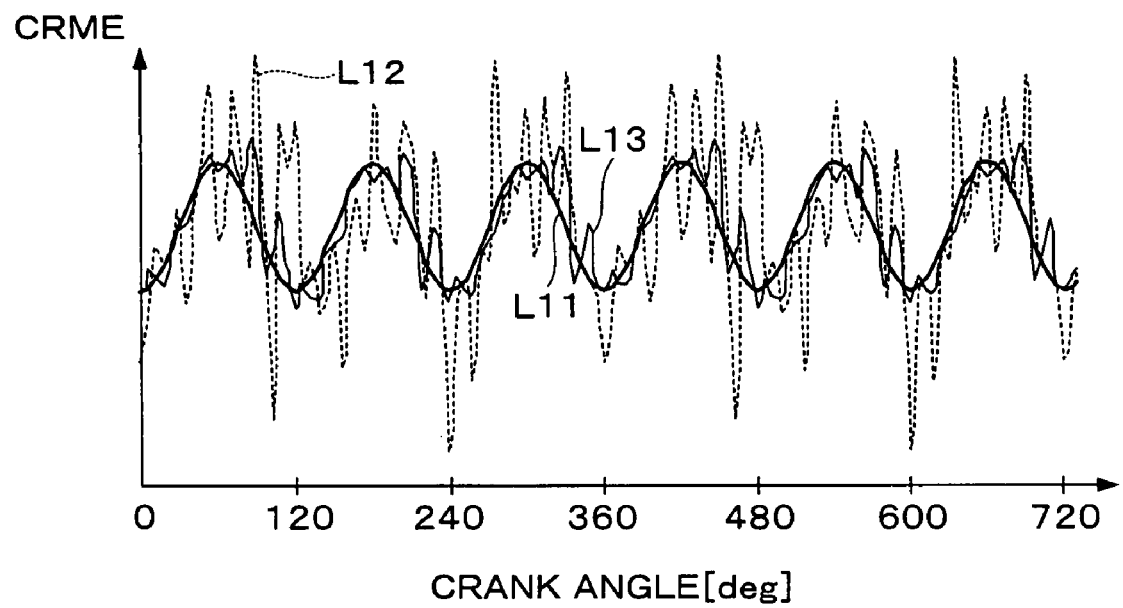
FIG. 11 is a time chart showing that the pulse wheel deviation decreases by the correction with a learning correction coefficient (KCRREF)

FIG. 11 is a time chart showing changes that occur to the time period parameter CRME during the fuel cut operation. FIG. 11 shows data before and after the correction by the learning correction coefficient KCRREF when the pulse wheel deviation is experimentally added. The solid line L11 shows the data before adding the pulse wheel deviation, the dashed line L12 shows the data without the correction after adding the pulse wheel deviation, and the solid line L13 shows the data with the correction after adding the pulse wheel deviation. It is understood from FIG. 11 that the pulse wheel deviation is suppressed by the correction. Therefore, the misfire determination parameter MFJUDd is stabilized and an erroneous determination is prevented.

Figure 12:
FIG. 12 is a diagram showing a correction degree (DCR) of the pulse wheel deviation correction.

FIG. 12 is a bar graph showing magnitudes DCR (correction degrees) of the components removed by the correction according to the method of this embodiment in comparison with the results obtained by the correction according to the conventional method. In FIG. 12, the bars with hatching correspond to the method of this embodiment. As shown in FIG. 12, the 3rd order component (inertial force rotational speed component), as well as the 6th and 9th order components, which are the harmonic components of the 3rd order component, are not corrected. With respect to the other components, the correction degrees of the method in this embodiment are similar to those of the conventional method.

Figure 13:
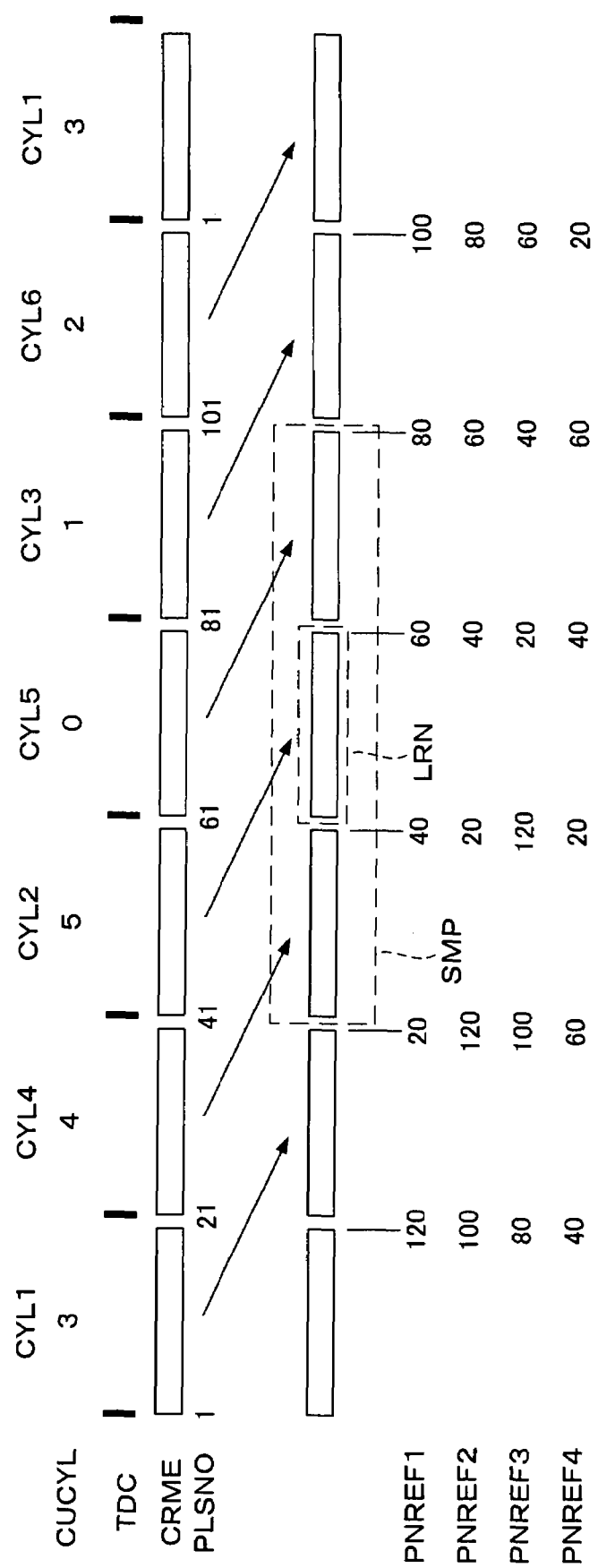
FIG. 13 is a diagram illustrating an outline of the correction method of the present invention.

FIG. 13 is a diagram illustrating the above-described calculation method of the learning correction coefficient KCRREF. In FIG. 13, "TDC" indicates timings when the piston in any one of the cylinders reaches the top dead center. Cylinder numbers CYL1 to CYL6 are provided across the top of FIG. 13 and correspond to the cylinder on the explosion stroke. The cylinder numbers CYL1 to CYL6 are numbered in the order of arrangement of the cylinders, and "CUCYL" indicates a cylinder discrimination number set to any one of "0" to "5" for discriminating each cylinder in the order of ignition. Further, "PLSNO" indicates a pulse number given to the CRK pulse generated at every six degrees of the crank angle and takes any one value of "1" to "120" corresponding to two rotations of the crankshaft. Since the number of the teeth on the pulse wheel is "60", two pulse numbers correspond to one tooth (e.g., PLSNO=1 and 61 corresponds to the same tooth on the pulse wheel). The detected time period parameter CRME is subjected to calculations in the CPU in the ECU 5 as an array consisting of 120 data points corresponding to the pulse number PLSNO.

In this embodiment, the learning correction coefficient KCRREF corresponding to the sampling data in a learning range LRN located at the center of a sampling range SMP is calculated using data sampled in the sampling range SMP of 360 degrees of the crank angle (three TDC periods) shown in FIG. 13.

It is to be noted that PNREF1 to PNREF4 shown in FIG. 13 are indexes for directing array data used for the calculation of the learning correction coefficient KCRREF and, hereinafter, are referred to, respectively, as "first index" to "fourth index". Further, the arrows in FIG. 13 indicate time lags between the calculation timings in the CPU using the detected time period parameter CRME and the detection timings.

Figure 14:
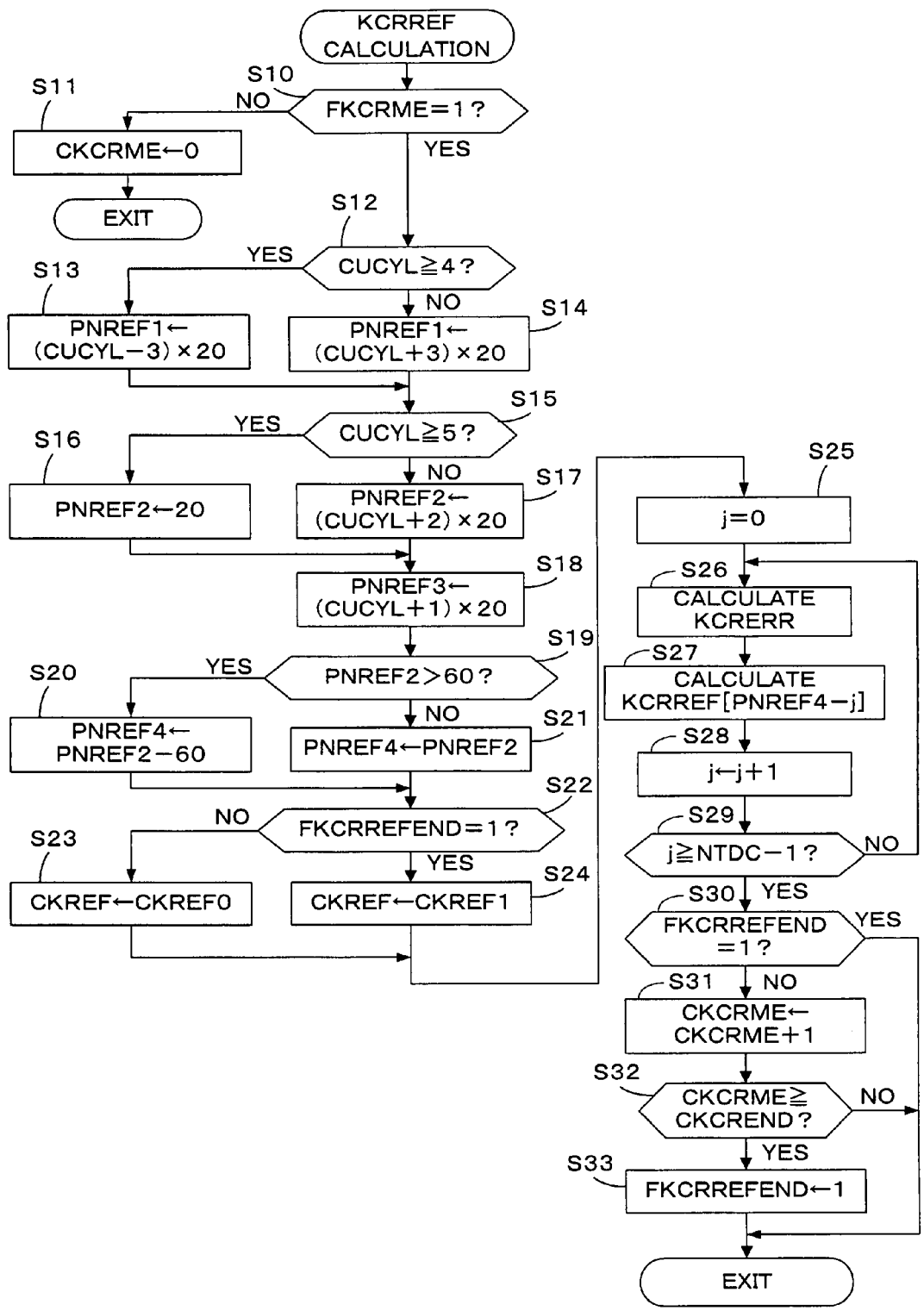
FIG. 14 is a flowchart of a process for calculating the learning correction coefficient (KCRREF)

FIG. 14 is a flowchart of a calculation process of the learning correction coefficient KCRREF. The calculation process is executed by the CPU in the ECU 20 so as to take place at the same time the TDC pulse is generated.

In step S10, it is determined whether a learning execution condition is satisfied. The learning execution condition is satisfied, for example, when performing the fuel cut operation. When the learning execution condition is not satisfied, a counter CKCRME, which counts a number of execution times of the learning, is initialized to "0" (step S11).

When the learning execution condition is satisfied, the first to fourth indexes PNREF1 to PNREF4 are calculated in steps S12 to S21. In step S12, it is determined whether the cylinder discrimination number CUCYL is equal to or greater than "4". If the answer to step S12 is affirmative (YES), the first index PNREF1 is calculated by equation (11) (step S13). On the other hand, if CUCYL is less than "4", the first index PNREF1 is calculated by equation (12) (step S14).

$$PNREF1=(CUCYL-3)\times 20 \quad (11)$$

$$PNREF1=(CUCYL+3)\times 20 \quad (12)$$

In step S15, it is determined whether the cylinder discrimination number CUCYL is equal to or greater than "5". If the answer to step S15 is affirmative (YES), the second index PNREF2 is set to "20" (step S16). On the other hand, if CUCYL is less than "5", the second index PNREF2 is calculated by equation (13) (step S17).

$$PNREF2=(CUCYL+2)\times 20 \quad (13)$$

In step S18, the 3rd index PNREF3 is calculated by equation (14).

$$PNREF3=(CUCYL+1)\times 20 \quad (14)$$

In step S19, it is determined whether the second index PNREF2 is greater than "60". If the answer to step S19 is affirmative (YES), the 4th index PNREF4 is calculated by equation (15) (step S20).

$$PNREF4=PNREF2-60 \quad (15)$$

On the other hand, if PNREF2 is equal to or less than "60", the fourth index PNREF4 is set to the second index PNREF2 (step S21). The 4th index PNREF4 is set to "1" to "60" when the second index PNREF2 takes values from "61" to "120".

In step S22, it is determined whether a learning end flag FKCRREFEND is equal to "1". The learning end flag FKCRREFEND is set to "1" in step S33 when the learning is completed. Accordingly, the answer to step S22 is initially negative (NO), and the process proceeds to step S23, wherein an averaging coefficient CKREF is set to a first coefficient value CKREF0 (e.g., 0.2). Further, after completion of the learning, the averaging coefficient CKREF is set to a second coefficient value CKREF1 (e.g., 0.02) (step S24). Both of the first and the second coefficient values CKREF0 and CKREF1 are set to a value greater than "0" and less than "1", and the first coefficient value CKREF0 is set to be greater than the second coefficient value CKREF1.

When the learning has not been performed, i.e., at the time of factory shipment, it is necessary to immediately complete the learning. Therefore, the averaging coefficient CKREF is set to the first coefficient value CKREF0 which is comparatively large. Thereafter, the second coefficient value CKREF1 is applied to gradually update the learning correction coefficient KCRREF.

In step S25, a calculation index j is set to "0". In step S26, the error ratio KCRERR is calculated by equation (16).

$$KCRERR = \frac{CRME[PNREF1-j] + CRME[PNREF2-j] + CRME[PNREF3-j]}{CRME[PNREF2-j] \times 3} \quad (16)$$

In step S27, the error ratio KCRERR and the averaging coefficient CKREF are applied to equation (17) to calculate the learning correction coefficient KCRREF[PNREF4-j].

$$KCRREF[PNREF4-j] = \quad (17)$$
$$CKREF \times KCRERR + (1 - CKREF) \times KCRREF[PNREF4-j]$$

where KCRREF[PNREF4-j] on the right side is the preceding calculated value.

In step S28, the calculation index j is incremented by "1", and it is determined whether the calculation index j is equal to or greater than (NTDC−1) (step S29). NTDC is a number of data points obtained in one TDC period (=720/(N·Dθ), N is a number of cylinders, and Dθ is a sampling angle interval which is set to "20" in this embodiment. Since the answer to step S29 is initially negative (NO), the process returns to step S26. If the calculation of the learning correction coefficient KCRREF[PNREF4-j] is completed with respect to values of the calculation index j from "0" to (NTDC−1), the process proceeds to step S30 from step S29.

In step S30, it is determined whether the learning end flag FKCRREFEND is equal to "1". Since the answer to step S30 is initially negative (NO), the process proceeds to step S31, wherein the counter CKCRME is incremented by "1". Subsequently, it is determined whether the value of the counter CKCRME is equal to or greater than a predetermined value CKCREND (step S32). Since the answer to step S32 is initially negative (NO), the process immediately ends. If the value of the counter CKCRME reaches the predetermined value CKCREND, the learning end flag FKCRREFEND is set to "1" (step S33).

The predetermined value CKCREND is set to a value corresponding to, for example, ten rotations of the engine. That is, with respect to the 6-cylinder engine, the predetermined value CKCREND is set to "30". Generally, with respect to an N-cylinder engine, the predetermined value CKCREND is set to 3600/(720/N).

If the process of FIG. 14 is executed once, the learning correction coefficients KCRREF corresponding to 20 teeth (intervals of the teeth) of the pulse wheel are obtained. The learning correction coefficients KCRREF correspond to 60 intervals of the teeth by executing the process of FIG. 14 three times.

Figure 15:
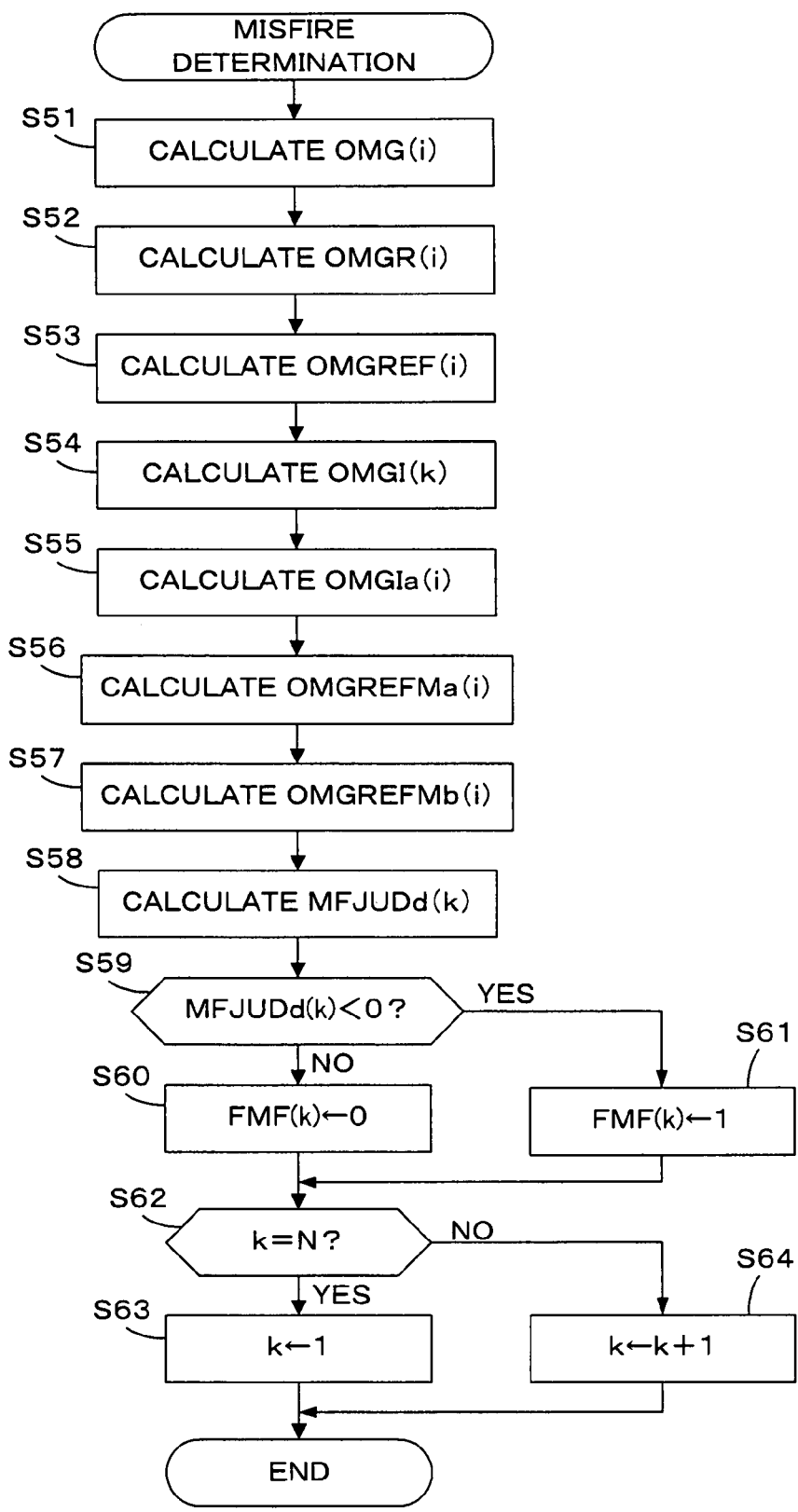
FIG. 15 is a flowchart of the misfire determination process.

FIG. 15 is a flowchart of a misfire determination process. The misfire determination process is executed by the CPU in the ECU 20 so as to take place at the same time the TDC pulse is generated. It is to be noted that the detected data of the time period parameter CRME (i), which is a time interval of generation of the CRK pulse generated at every six degrees of the crank angle, is stored in a buffer memory of the memory circuit. Specifically, the data corresponding to a crank angular range of 720 degrees (i=0−(ND−1) and the data number ND is "120") is stored in the buffer memory. Further, in the process of FIG. 15, a calculation index k (=1 to 6), which corresponds to the cylinder discrimination number CUCYL in the order of ignition, is used instead of the cylinder discrimination number CUCYL itself. If a number of the data points in one TDC period is expressed by "NTDC" (NTDC=20 in this embodiment), calculations in which the parameter "i" takes values from (k−1)NTDC to (kNTDC−1) are performed by executing the process once. For example, when the process performs the calculations corresponding to the first cylinder (k=1), the parameter "i" takes values from "0" to (NTDC−1), and when the process performs the calculations corresponding to the fifth cylinder (k=5), the parameter "i" takes values from 4NTDC to (5NTDC−1).

In step S51, the time period parameter CRME(i) is converted to a rotational speed OMG(i) [rad/s] by equation (21).

$$OMG(i)=D\theta/(CRME(i) \times KCRREF(i)) \quad (21)$$

In equation (21), Dθ is an angular interval 4π/ND for measuring the time period parameter CRME which is set to π/30 [rad] in this embodiment. Further, KCRREF(i) is the learning correction coefficient corresponding to the time period parameter CRME(i) calculated in the process of FIG. 14. In this embodiment, the learning correction coefficients KCRREF are used as an array having 60 data points. Accordingly, when "i" takes values from "60" to "119", KCRREF(0) to KCRREF(59) are applied to equation (21).

In step S52, the 720-degree filtering is performed to calculate the filtered rotational speed OMGR(i) by equation (22).

$$OMGR(i)=OMG(i)-(OMG(ND)-OMG(0)) \times D\theta \times i/4\pi \quad (22)$$

In step S53, the relative rotational speed OMGREF is calculated by equation (23).

$$OMGREF(i)=OMGR(i)-OMGR((k-1)NTDC) \quad (23)$$

where OMGR((k−1)NTDC) is the reference rotational speed corresponding to the filtered rotational speed when the piston in the cylinder, which is subjected to the determination, is positioned at the compression top dead center.

In step S54, the inertial force rotational speed OMGI(k) at the time the piston in the corresponding cylinder is positioned at the compression top dead center, is calculated by equation (24).

$$OMGI(k)=K \times OMG((k-1)NTDC)/3I \quad (24)$$

In addition, it is preferable to change the value of the inertia moment I according to whether the lockup clutch of the automatic transmission is engaged. This makes it possible to accurately perform the determination regardless of whether the lockup clutch is engaged.

In step S55, the inertial force rotational speed OMGI(k) calculated by equation (24) is applied to equation (25) to calculate the inertial force rotational speed OMGIa(i) corresponding to each sampled value of the rotational speed OMG (i). In equation (25), the inertial force rotational speed OMGI (k−3), which is an inertial force rotational speed at the timing of three TDC periods before, is applied. This is because calculation accuracy is improved by using the value at the center of the filtering range of the 720-degree filtering. Since the calculation index k is a cylinder discrimination number, values "0", "−1", and "−2" of "k" correspond, respectively, to the values "N" (=6), "N−1" (=5), and "N−2" (=4) of "k".

$$OMGIa(i)=OMGI(k-3)\times\{\cos(N\times D\ \theta\times i/2)-1\} \quad (25)$$

In step S56, the inertial force rotational speed OMGIa (i) calculated in step S55 is applied to equation (26) to calculate a first modified relative rotational speed OMGREFMa (i).

$$OMGREFMa(i)=OMGREF(i)-OMGIa(i) \quad (26)$$

In step S57, the first modified relative rotational speed OMGREFMa(i) calculated in step S56 and the combustion correlation function FCR(i) calculated by equation (27) are applied to equation (28) to calculate a second modified relative rotational speed OMGREFMb(i). Equation (27) is obtained by replacing "θ" in equation (8) with (Dθ×i).

$$FCR(i)=\{1-2\cos(N\times D\ \theta\times i/2)\}/2 \quad (27)$$

$$OMGREFMb(i)=OMGREFMa(i)\times FCR(i) \quad (28)$$

In step S58, the determination parameter MFJUDd (k) is calculated by equation (29).

$$MFJUDd(k) = \sum_{i=(k-1)NTDC}^{kNTDC-1} OMGREFMb(i) \quad (29)$$

In step S59, it is determined whether the determination parameter MFJUDd(k) is a negative value. If the answer to step S59 is affirmative (YES), it is determined that a misfire has occurred in #k cylinder, and a misfire flag FMF (k) is set to "1" (step S61). On the other hand, if MFJUDd(k) is equal to or greater than "0", it is determined that a normal combustion was performed, and the misfire flag FMF (k) is set to "0" (step S60).

In step S62, it is determined whether the cylinder discrimination number k is equal to the number N of cylinders. If the answer to step S62 is negative (NO), the cylinder discrimination number k is incremented by "1" (step S64). If the cylinder discrimination number k is equal to the number N of cylinders, the cylinder discrimination number k is returned to "1" (step S63).

The misfire determination is performed for each cylinder by the process of FIG. 15.

Figure 16:
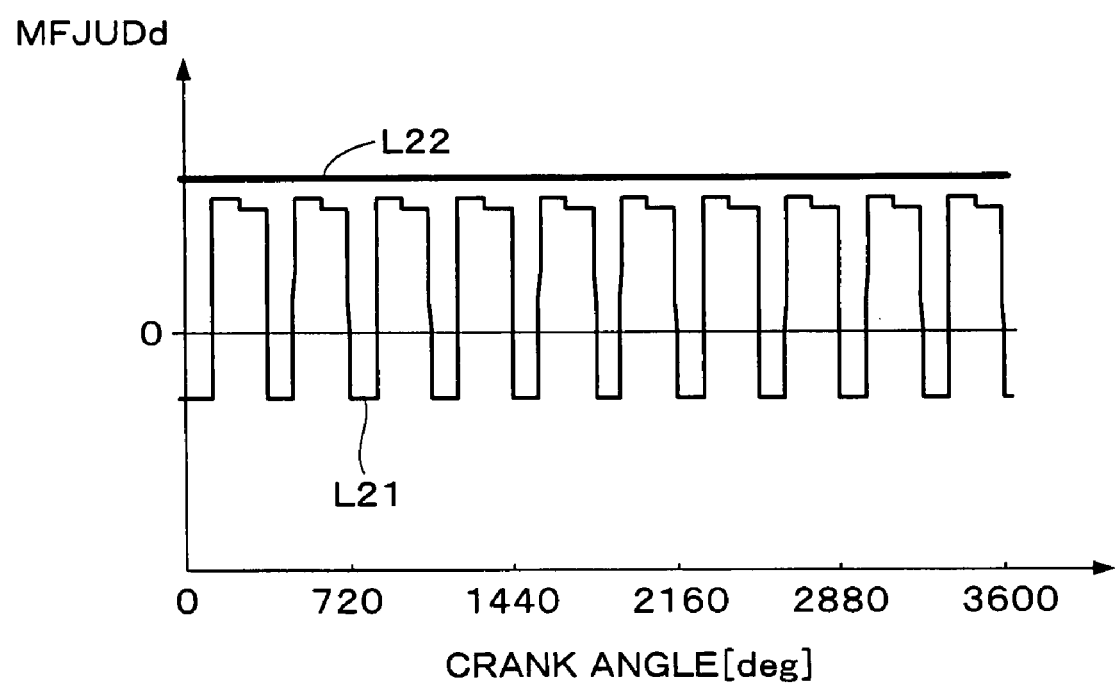
FIG. 16 is a time chart showing changes in a misfire determination parameter (MFJUDd) calculated in the process of FIG. 15.

FIG. 16 is a time chart showing changes in the determination parameter MFJUDd corresponding to the actually measured data shown in FIG. 11. The thin line L21, which changes in a pulsed wave form and indicates that the determination parameter MFJUDd takes a negative value, corresponds to a case where the correction of the pulse wheel deviation is not performed. The thick line L22 corresponds to a case where the correction of the pulse wheel deviation is performed. It is clear from FIG. 16 that an erroneous determination result in which the determination parameter MFJUDd takes a negative value is prevented by the correction of the pulse wheel deviation.

As described above, in the present embodiment, the error ratio KCRERR is calculated by dividing an average value ((numerator of the equation (16))/3) of the time period parameter CRME, which is sampled at intervals of 120 degrees, i.e., "720/N" degrees, by the time period parameter CRME[PNREF2−i], which is subjected to the learning; the learning correction coefficient KCRREF is calculated according to the error ratio KCRERR; and the time period parameter CRME is corrected by the learning correction coefficient KCRREF. As shown in FIG. 6C, the rotational speed changing component ωI due to the inertial force changes in the period of 120 degrees (720/N degrees). Therefore, the influence of the rotational speed changing components attributed to the inertial force is eliminated by calculating the average value of the time period parameter CRME sampled at 120-degree intervals. Consequently, the learning correction coefficient KCRREF is calculated according to the average value thus calculated, and the time period parameter CRME is corrected (equation (21)) with the learning correction coefficient KCRREF, thereby accurately correcting the pulse wheel deviation.

In this embodiment, the learning correction coefficient KCRREF is calculated and stored as an array of 60 data points corresponding to one rotation of the pulse wheel. Therefore, the correction is performed using the learning correction coefficient KCRREF corresponding to each pulse (all intervals of pulse generation) corresponding to one rotation of the crankshaft that the CRK sensor outputs.

Further, the sampling range SMP is set to have a width of three TDC periods, as shown in FIG. 13, and the learning correction coefficient KCRREF is calculated corresponding to the learning range LRN of one TDC period positioned at the center of the three TDC periods. Therefore, the speed changing component due to deceleration of the engine rotational speed is canceled by the averaging to accurately calculate the learning correction coefficient KCEREF.

In this embodiment, the time period parameter CRME corresponds to the speed parameter, the CRK sensor included in the crank angle position sensor 12 corresponds to the pulse generator, and the ECU 20 constitutes the averaging means, the learning means, and the correcting means. Specifically, step S26 of FIG. 14 corresponds to the averaging means, step S27 corresponds to the learning means, and step S51 of FIG. 15 corresponds to the correcting means.

Modification

Alternatively, the equation for calculating the error ratio KCRERR may be changed to equation (31). A parameter CRMED6 in equation (31) is calculated by equation (32). Specifically, the parameter CRMED6 is a sum of six time period parameter data points (three data points used in equation (16), and three data points adjacent to the former three data points). That is, the error ratio KCRERR is calculated using six time period parameter data points.

$$KCRERR[20-j] = \frac{CRMED6}{CRME[PNREF2-j]\times 6} \quad (31)$$

$$CRMED6 = CRME[PNREF1-j] + CRME[PNREF2-j] + \\ CRME[PNREF3-j] + CRME[PNREF1+1-j] + \\ CRME[PNREF2+1-j] + CRME[PNREF3+1-j] \quad (32)$$

When calculating the error ratio KCRERR by equation (31), the speed changing component due to deceleration of the engine rotational speed is not canceled by the averaging. Therefore, the following calculation process is necessary.

At first, an average error ratio KCRERRAVE is calculated as an average value of the error ratio KCRERR data in the learning range LRN by equation (33).

$$KCRERRAVE = \frac{\sum_{j=0}^{19} KCRERR[20-j]}{20} \quad (33)$$

Subsequently, the error ratio KCRERR calculated by equation (31) is applied to equation (34) to calculate a modified error ratio KCRERRM. The modified error ratio KCRERRM is applied to equation (17) to calculate the learning correction coefficient KCRREF.

$$KCRERRM = KCRERR - KCRERRAVE + 1 \quad (34)$$

The average error ratio KCRERRAVE indicates the speed changing component due to deceleration of the engine speed. Therefore, by using the modified corrected error ratio KCRERRM calculated by equation (34), the speed changing component due to deceleration is eliminated, thereby accurately calculating the learning correction coefficient.

Second Embodiment

In this embodiment, the present invention is applied to a 4-cylinder engine. The second embodiment is the same as the first embodiment except for the points described below.

Figure 17:
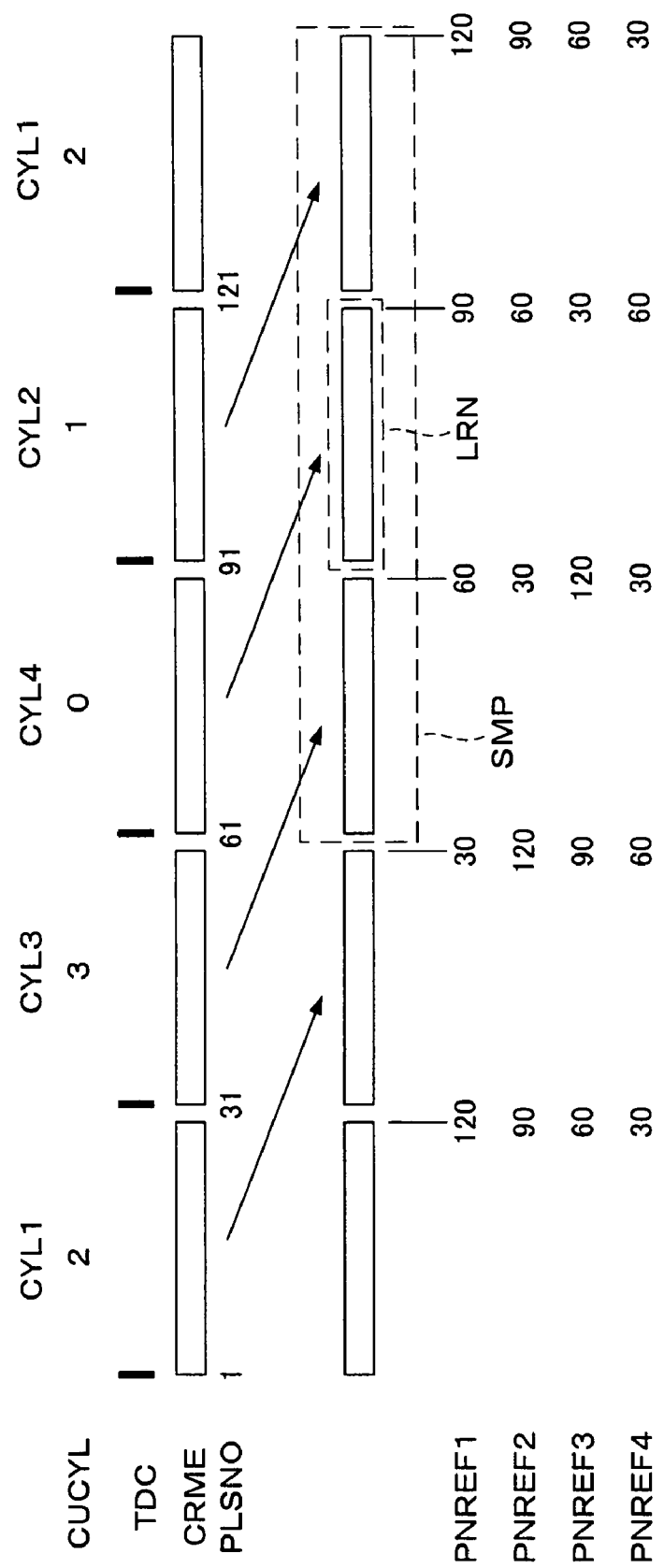
FIG. 17 is a diagram illustrating an outline of the correction method according to a second embodiment of the present invention.

FIG. 17 is a diagram illustrating the calculation method of the learning correction coefficient in this embodiment. The labels of the parameters used in FIG. 17 are defined similarly as those in FIG. 13. In the case of a 4-cylinder engine, three TDC periods, i.e., the crank angular range corresponding to 1.5 rotations of the crankshaft, is defined as the sampling range SMP, and one TDC period located at the center of the three TDC periods is defined as the learning range LRN. When the sampling range exceeds 360 degrees, as in this embodiment, the averaging calculation is performed by weighting the data corresponding to the learning range LRN twice as much as the data corresponding to the range other than the learning range LRN. The weighting is performed because the data obtained in the one TDC period immediately before the learning range LRN of FIG. 17 and the data obtained in the one TDC period immediately after the learning range LRN actually correspond to the same teeth of the pulse wheel. Therefore, by performing the weighted averaging calculation, weightings for all of the teeth (all of the intervals of pulse generation) in the averaging calculation are made equal, and accuracy of the averaging calculation is improved.

Figure 18:
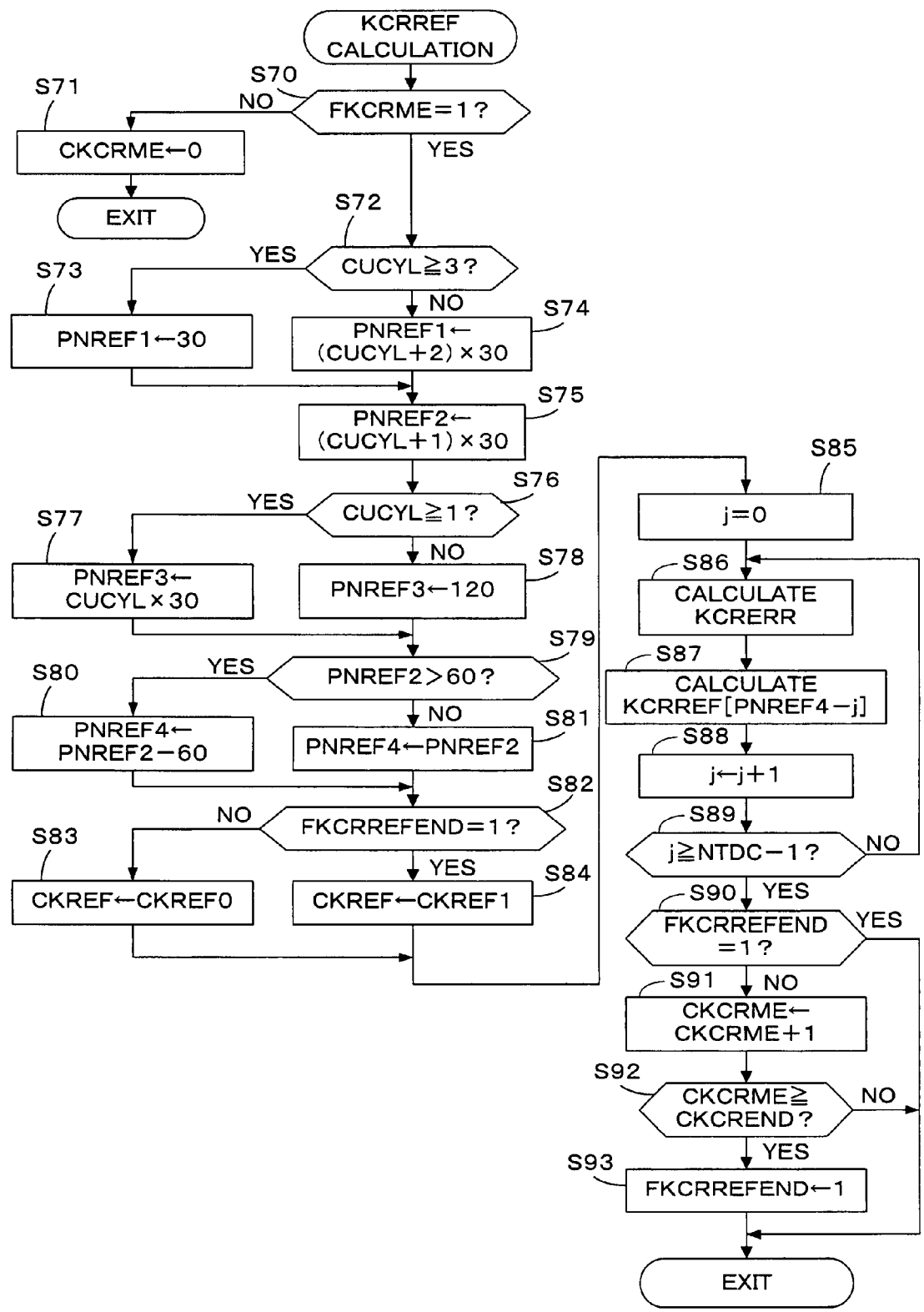
FIG. 18 is a flowchart of a process for calculating the learning correction coefficient in the second embodiment.

FIG. 18 is a flowchart of the process for calculating the learning correction coefficient in this embodiment. Steps S70, S71, S79 to S85, and S87 to S93 of FIG. 18, are the same as steps S10, S11, S19 to S25, and S27 to S33 of FIG. 12. Only different steps will be described below. The data number NTDC in step S89 is "30".

In step S72, it is determined whether the cylinder discrimination number CUCYL is equal to or greater than "3". If the answer to step S72 is affirmative (YES), the first index PNREF1 is set to "30" (step S13). On the other hand, if CUCYL is less than "3", the first index PNREF1 is calculated by equation (41) (step S74).

$$PNREF1 = (CUCYL+2) \times 30 \quad (41)$$

In step S75, the second index PNREF2 is calculated by equation (42).

$$PNREF2 = (CUCYL+1) \times 30 \quad (42)$$

In step S76, it is determined whether the cylinder discrimination number CUCYL is equal to or greater than "1". If the answer to step S76 is affirmative (YES), the third index PNREF3 is calculated by equation (43) (step S77). On the other hand, if CUCYL is equal to "0", the third index PNREF3 is set to "120" (step S78).

$$PNREF3 = CUCYL \times 30 \quad (43)$$

The first to third indexes PNREF1 to PNREF3 in the case of a 4-cylinder engine are calculated by the above-described steps. The calculation method of the fourth index PNREF4 is the same as the method shown in FIG. 14 (steps S79 to S81).

In step S86, the error ratio KCRERR is calculated by equation (44). Equation (44) performs the weighted averaging calculation as described above.

$$KCRERR = \frac{CRME[PNREF1-j] + CRME[PNREF2-j] \times 2 + CRME[PNREF3-j]}{CRME[PNREF2-j] \times 4} \quad (44)$$

In this embodiment, as described above, the time period parameter CRME in the learning range LRN is weighted twice as much as the time period parameter CRME in the angular ranges other than the learning range LRN. Therefore, the weighting corresponding to all of the teeth of the pulse wheel becomes uniform, and the averaging of the time period parameter CRME detected in the learning range LRN is appropriately performed to obtain accurate learning correction coefficients KCRREF.

In this embodiment, step S86 of FIG. 18 corresponds to the averaging means, and step S87 corresponds to the learning means.

The present invention is not limited to the embodiment described above and various modifications may be made. For example, in the above-described embodiment, the time period parameter CRME is used as a speed parameter for calculating the learning correction coefficient KCRREF. Alternatively, the parameter indicative of the rotational speed of the crankshaft proportional to the reciprocal of the time period parameter CRME may be used.

Further, in the above-described embodiment, examples in which the present invention is applied to a 6-cylinder engine and a 4-cylinder engine are described. The present invention is also applicable to engines having any number of cylinders. For example, with respect to an 8-cylinder engine, it is preferable that the sampling range SMP is set to five TDC periods and the learning range LRN is set to one TDC period at the center of the sampling range. Preferably, the sampling range SMP is set to a period obtained by multiplying one TDC period by an odd number and is set to a period corresponding to more than one rotation of the crankshaft. When the sampling range SMP is set to a period corresponding to one rotation of the crankshaft, such as the example of a 6-cylinder engine, the weightings for all of the data used for calculating the error ratio KCRERR may be equal (i.e., weighted averaging is not necessary). However, with respect to a 4-cylinder engine or an 8-cylinder engine, it is necessary to perform the weighted averaging calculation since the sampling range SMP exceeds 360 degrees.

Further, with respect to a 3-cylinder engine, it is preferable that the sampling range SMP is set to three TDC periods, and the learning range LRN is set to one TDC period (240 degrees) at the center of the sampling range. The weighted averaging calculation should be performed since the sampling range SMP exceeds 360 degrees.

Further, in the above-described embodiment, the learning correction coefficient KCREF is calculated and stored corresponding to one rotation of the crankshaft. Alternatively, the learning correction coefficient KCRREF may be calculated and stored corresponding to two rotations of the crankshaft, i.e., one cycle of the engine operation. In this case, it is not necessary to use the fourth index PNREF4, and the learning correction coefficient KCRREF is calculated by equation (51) instead of equation (17) described above. According to this method, the learning correction coefficient KCRREF is calculated and stored as an array of 120 data points. In this case, KCRREF[1] and KCRREF[61], for example, are learning correction coefficients corresponding to the same teeth of the pulse wheel. However, KCRREF[1] and KCRREF[61] take different values if there is a speed changing component which has a period of two rotations of the crankshaft.

$$KCRREF[PNREF2 - j] = \\ CKREF \times KCRERR + (1 - CKREF) \times KCRREF[PNREF2 - j] \quad (51)$$

Using the learning correction coefficients KCRREF, corresponding to two rotations of the crankshaft, makes it possible to correct the speed changing component having a period of two rotations of the crankshaft, e.g., a changing in the time interval of the pulse generation due to axle center movement of the crankshaft.

Further, in the above-described embodiment, the learning correction coefficient KCRREF is calculated during the fuel cut operation. Alternatively, the learning coefficient KCRREF is calculated in a normal combustion operating condition where no misfire positively occurs.

Further, the present invention can be applied also to an angular speed detecting apparatus for a crankshaft of a watercraft propulsion engine, such as an outboard engine having a vertically extending crankshaft.

The present invention may be embodied in other specific forms without departing from the spirit or essential characteristics thereof. The above-disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. An angular speed detecting apparatus for a crankshaft of an internal combustion engine, said angular speed detecting apparatus detects a rotational angular speed of said crankshaft based on an output of a pulse generator which generates a crank pulse at every predetermined rotational angle of said crankshaft, said angular speed detecting apparatus comprising:

averaging means for calculating an average value of data of a speed parameter indicating a rotational angular speed of said crankshaft, the data being sampled at intervals of 720/N degrees where (N) is a number of cylinders of said engine;

learning means for calculating a learning correction coefficient for correcting the speed parameter according to the average value; and correcting means for correcting the speed parameter using the learning correction coefficient, wherein said averaging means calculates the average value of the data of the speed parameter sampled within a sampling range set according to a number of cylinders of said engine, and said learning means calculates the learning correction coefficient corresponding to a predetermined central angular range located at the center of the sampling range, and wherein the sampling range is set to an angular width obtained by multiplying 720/N degrees by an odd number, and the predetermined central angular range has a width of 720/N degrees.

2. An angular speed detecting apparatus according to claim 1, wherein said learning means calculates and stores the learning correction coefficient corresponding to one rotation of said crankshaft.

3. An angular speed detecting apparatus according to claim 1, wherein said learning means calculates and stores the learning correction coefficient corresponding to two rotations of said crankshaft.

4. An angular speed detecting apparatus according to claim 1, wherein said averaging means performs the averaging calculation so that sampled data obtained in the predetermined central angular range is weighted greater than sampled data obtained in an angular range other than the predetermined central angular range when the sampling range exceeds 360 degrees.

5. An angular speed detecting apparatus according to claim 1, further including:

error ratio calculating means for calculating an error ratio by dividing the average value by the sampled speed parameter; and average error ratio calculating means for calculating an average error ratio which is an average value of all of the error ratios obtained in the predetermined central angular range, wherein said learning means calculates a corrected error ratio by subtracting the average error ratio from the error ratio and adding "1" to the subtracted error ratio, and calculates the learning correction coefficient according to the corrected error ratio.

6. An angular speed detecting method for a crankshaft of an internal combustion engine, for detecting a rotational angular speed of said crankshaft based on an output of a pulse generator which generates a crank pulse at every predetermined rotational angle of said crankshaft, said angular speed detecting method comprising the steps of:

a) calculating an average value of data of a speed parameter indicating a rotational angular speed of said crankshaft, the data being sampled at intervals of 720/N degrees where (N) is a number of cylinders of said engine;

b) calculating a learning correction coefficient for correcting the speed parameter according to the average value; and c) correcting the speed parameter using the learning correction coefficient, wherein the average value of the speed parameter data sampled within a sampling range, which is set according to a number of cylinders of said engine, is calculated in said step a), and the learning correction coefficient is calculated corresponding to a predetermined central angular range located at the center of the sampling range in said step b), and wherein the sampling range is set to an angular width obtained by multiplying 720/N degrees by an odd number, and the predetermined central angular range has a width of 720/N degrees.

7. An angular speed detecting method according to claim 6, wherein the learning correction coefficient is calculated and stored corresponding to one rotation of said crankshaft.

8. An angular speed detecting method according to claim 6, wherein the learning correction coefficient is calculated and stored corresponding to two rotations of said crankshaft.

9. An angular speed detecting method according to claim 6, wherein the averaging calculation is performed so that sampled data obtained in the predetermined central angular range is weighted greater than sampled data obtained in an angular range other than the predetermined central angular range when the sampling range exceeds 360 degrees.

10. An angular speed detecting method according to claim 6, further including the steps of:
- d) calculating an error ratio by dividing the average value by the sampled speed parameter;
- e) calculating an average error ratio which is an average value of all of the error ratios obtained in the predetermined central angular range; and
- f) calculating a corrected error ratio by subtracting the average error ratio from the error ratio and adding "1" to the subtracted error ratio, wherein the learning correction coefficient is calculated according to the corrected error ratio.

11. A computer program embodied on a computer-readable medium for causing a computer to implement an angular speed detecting method for a crankshaft of an internal combustion engine, for detecting a rotational angular speed of said crankshaft based on an output of a pulse generator which generates a crank pulse at every predetermined rotational angle of said crankshaft, said angular speed detecting method comprising the steps of:
- a) calculating an average value of data of a speed parameter indicating a rotational angular speed of said crankshaft, the data being sampled at intervals of 720/N degrees where (N) is a number of cylinders of said engine;
- b) calculating a learning correction coefficient for correcting the speed parameter according to the average value; and
- c) correcting the speed parameter with the learning correction coefficient, wherein the average value of the speed parameter data sampled within a sampling range, which is set according to a number of cylinders of said engine, is calculated in said step a), and the learning correction coefficient is calculated corresponding to a predetermined central angular range located at the center of the sampling range in said step b), and wherein the sampling range is set to an angular width obtained by multiplying 720/N degrees by an odd number, and the predetermined central angular range has a width of 720/N degrees.

12. A computer program according to claim 11, wherein the learning correction coefficient is calculated and stored corresponding to one rotation of said crankshaft.

13. A computer program according to claim 11, wherein the learning correction coefficient is calculated and stored corresponding to two rotations of said crankshaft.

14. A computer program according to claim 11, wherein the averaging calculation is performed so that sampled data obtained in the predetermined central angular range is weighted greater than sampled data obtained in an angular range other than the predetermined central angular range when the sampling range exceeds 360 degrees.

15. A computer program according to claim 11, wherein said angular speed detecting method further includes the steps of:
- d) calculating an error ratio by dividing the average value by the sampled speed parameter;
- e) calculating an average error ratio, which is an average value of all of the error ratios obtained in the predetermined central angular range; and
- f) calculating a corrected error ratio by subtracting the average error ratio from the error ratio and adding "1" to the subtracted error ratio, wherein the learning correction coefficient is calculated according to the corrected error ratio.

* * * * *